(12) United States Patent
Morris et al.

(10) Patent No.: US 9,413,721 B2
(45) Date of Patent: Aug. 9, 2016

(54) METHODS AND APPARATUS FOR DEALING WITH MALWARE

(75) Inventors: Melvyn Morris, Belper (GB); Joseph Jaroch, Elk Grove Village, IL (US)

(73) Assignee: WEBROOT INC., Broomfield, CO (US)

( * ) Notice: Subject to any disclaimer, the term of this patent is extended or adjusted under 35 U.S.C. 154(b) by 0 days.

(21) Appl. No.: 13/372,375

(22) Filed: Feb. 13, 2012

(65) Prior Publication Data

US 2012/0260340 A1     Oct. 11, 2012

Related U.S. Application Data

(60) Provisional application No. 61/443,095, filed on Feb. 15, 2011.

(51) Int. Cl.
H04L 29/06 (2006.01)
G06F 21/56 (2013.01)

(52) U.S. Cl.
CPC ............ H04L 63/0263 (2013.01); G06F 21/56 (2013.01); G06F 21/566 (2013.01); H04L 63/14 (2013.01); H04L 63/145 (2013.01)

(58) Field of Classification Search
USPC .......................................................... 726/23
See application file for complete search history.

(56) References Cited

U.S. PATENT DOCUMENTS

| 6,175,869 | B1 | 1/2001 | Ahuja et al. |
| 6,219,786 | B1 | 4/2001 | Cunningham et al. |
| 6,842,878 | B1 | 1/2005 | Johnson et al. |
| 7,051,365 | B1 | 5/2006 | Bellovin |
| 7,188,173 | B2 * | 3/2007 | Anderson et al. ............. 709/225 |
| 7,231,440 | B1 * | 6/2007 | Kouznetsov et al. ......... 709/224 |
| 7,343,626 | B1 | 3/2008 | Gallagher |
| 7,555,476 | B2 | 6/2009 | Holbrook |
| 7,707,634 | B2 | 4/2010 | Sandu et al. |
| 7,761,912 | B2 | 7/2010 | Yee et al. |
| 7,814,056 | B2 * | 10/2010 | McGrattan et al. ........... 707/640 |

(Continued)

FOREIGN PATENT DOCUMENTS

| EP | 1315066 A1 | 5/2003 |
| JP | H08-44677 | 2/1996 |
| JP | 2009-500706 | 1/2009 |

OTHER PUBLICATIONS

Morris, et al., "Specification for related U.S. Appl. No. 13/372,433," filed Feb. 13, 2012, p. 58 to be published in: US.

(Continued)

Primary Examiner — Dede Zecher
Assistant Examiner — Jason C Chiang
(74) Attorney, Agent, or Firm — Merchant & Gould P.C.

(57) ABSTRACT

Methods for classifying computer objects as malware and the associated apparatus are disclosed. An exemplary method includes, at a base computer, receiving data about a computer object from each of plural remote computers on which the object or similar objects are stored or processed wherein the base computer comprises plural threat servers arranged to receive the data from the plural remote computers and apply rules or heuristics against the data in real time to determine whether or not the object is malware and to communicate the determination to the remote computers. The base computer includes at least one central server in communication with the threat servers and arranged to receive the data about objects from the threat servers to maintain a master database of data received about objects from all threat servers.

15 Claims, 15 Drawing Sheets

(56) References Cited

U.S. PATENT DOCUMENTS

| | | | |
|---|---|---|---|
| 7,921,063 B1* | 4/2011 | Quinlan | 706/12 |
| 7,921,459 B2 | 4/2011 | Houston et al. | |
| 8,042,184 B1 | 10/2011 | Batenin | |
| 8,116,732 B2* | 2/2012 | Issa et al. | 455/410 |
| 8,146,135 B2 | 3/2012 | Waissbein et al. | |
| 8,195,938 B2* | 6/2012 | Fanton et al. | 713/165 |
| 8,225,218 B2 | 7/2012 | Frayman et al. | |
| 8,234,709 B2* | 7/2012 | Viljoen et al. | 726/24 |
| 8,276,202 B1* | 9/2012 | Dubrovsky et al. | 726/22 |
| 8,296,178 B2* | 10/2012 | Hudis et al. | 370/401 |
| 8,301,904 B1* | 10/2012 | Gryaznov | 713/188 |
| 8,307,435 B1 | 11/2012 | Mann et al. | |
| 8,321,540 B2* | 11/2012 | Webb-Johnson | 709/221 |
| 8,321,944 B1* | 11/2012 | Mayer et al. | 726/25 |
| 8,332,946 B1* | 12/2012 | Boisjolie et al. | 726/24 |
| 8,336,100 B1* | 12/2012 | Glick et al. | 726/23 |
| 8,347,375 B2* | 1/2013 | Graham et al. | 726/13 |
| 8,347,386 B2* | 1/2013 | Mahaffey et al. | 726/23 |
| 8,352,484 B1* | 1/2013 | Schneider | 707/758 |
| 8,407,790 B2 | 3/2013 | Mony | |
| 8,443,447 B1* | 5/2013 | Chen et al. | 726/24 |
| 8,448,243 B1* | 5/2013 | Sankruthi | 726/22 |
| 8,453,244 B2* | 5/2013 | Dai et al. | 726/24 |
| 8,499,283 B2 | 7/2013 | Mony | |
| 8,543,694 B2 | 9/2013 | Petersen et al. | |
| 2003/0093429 A1* | 5/2003 | Nishikawa et al. | 707/10 |
| 2003/0188194 A1 | 10/2003 | Currie et al. | |
| 2004/0103315 A1 | 5/2004 | Cooper et al. | |
| 2005/0131959 A1 | 6/2005 | Thorman et al. | |
| 2005/0172338 A1 | 8/2005 | Sandu et al. | |
| 2005/0187740 A1 | 8/2005 | Marinescu | |
| 2006/0069912 A1 | 3/2006 | Zheng et al. | |
| 2006/0080637 A1 | 4/2006 | Treit et al. | |
| 2006/0090073 A1 | 4/2006 | Steinberg et al. | |
| 2006/0101334 A1 | 5/2006 | Liao et al. | |
| 2006/0117055 A1 | 6/2006 | Doyle | |
| 2006/0161856 A1 | 7/2006 | Heir | |
| 2006/0272020 A1 | 11/2006 | Gardner | |
| 2007/0016953 A1 | 1/2007 | Morris et al. | |
| 2007/0028304 A1* | 2/2007 | Brennan | 726/24 |
| 2007/0174429 A1 | 7/2007 | Mazzaferri et al. | |
| 2007/0220043 A1 | 9/2007 | Oliver et al. | |
| 2008/0109473 A1 | 5/2008 | Dixon et al. | |
| 2008/0115190 A1 | 5/2008 | Aaron | |
| 2008/0148381 A1 | 6/2008 | Aaron | |
| 2008/0229422 A1 | 9/2008 | Hudis et al. | |
| 2009/0070304 A1* | 3/2009 | Chen et al. | 707/3 |
| 2009/0089040 A1 | 4/2009 | Monastyrsky et al. | |
| 2009/0172774 A1 | 7/2009 | Koti et al. | |
| 2009/0292791 A1 | 11/2009 | Livshits et al. | |
| 2009/0300764 A1 | 12/2009 | Freeman | |
| 2010/0043072 A1 | 2/2010 | Rothwell | |
| 2010/0064368 A1 | 3/2010 | Stolfo et al. | |
| 2010/0306851 A1 | 12/2010 | Zhou | |
| 2010/0313183 A1 | 12/2010 | Ellen et al. | |
| 2010/0332593 A1* | 12/2010 | Barash et al. | 709/203 |
| 2011/0047594 A1 | 2/2011 | Mahaffey et al. | |
| 2011/0083183 A1 | 4/2011 | Freeman | |
| 2011/0138361 A1 | 6/2011 | McEntee et al. | |
| 2011/0191299 A1* | 8/2011 | Huynh Huu et al. | 707/646 |
| 2011/0191341 A1* | 8/2011 | Meyer et al. | 707/736 |
| 2011/0197177 A1 | 8/2011 | Mony | |
| 2011/0197272 A1 | 8/2011 | Mony | |
| 2012/0017200 A1 | 1/2012 | Ghosh et al. | |
| 2012/0260304 A1 | 10/2012 | Morris et al. | |
| 2012/0266208 A1 | 10/2012 | Morris et al. | |

OTHER PUBLICATIONS

Morris, et al., "Specification for related U.S. Appl. No. 13/372,439," filed Feb. 13, 2012, p. 54 to be published in: US.
Sogno-Pabis, Elzbieta, "Partial International Search Report re application PCT/EP2012/052497", May 4, 2012, p. 7, Published in: NL.
Clarke, "Fuzzing for Software Vulnerability Discovery—Technical Report RHUL-MA-2009-04," Department of Mathematics, Royal Holloway, University of London, Feb. 17, 2009, 178 pages. Retrieved from: www.ma.rhul.ac.uk/static/techrep/2009/RHUL-MA-2009-04.pdf.
Su et al., "The Essence of Command Injection Attacks in Web Applications," Conference record of the 33rd ACM SIGPLAN-SIGACT symposium on Principles of programming languages (POPL '06), 2006, pp. 372-382.
Official Action for U.S. Appl. No. 12/703,074 mailed Sep. 12, 2012, 16 pages.
Notice of Allowance for U.S. Appl. No. 12/703,074 mailed Nov. 21, 2012, 5 pages.
Notice of Allowance for U.S. Appl. No. 13/010,639 mailed Mar. 20, 2013, 15 pages.
Official Action for U.S. Appl. No. 13/372,433 mailed Apr. 24, 2013, 6 pages.
Official Action for U.S. Appl. No. 13/372,439 mailed Apr. 22, 2013, 6 pages.
Extended European Search Report for EP Application No. 14161844.7, mailed Jul. 25, 2014, 5 pages.
Extended European Search Report for EP Application No. 14161847.0, mailed Jul. 25, 2014, 5 pages.
International Search Report and Written Opinion for International (PCT) Patent Application No. PCT/EP2012/052497 mailed Jul. 13, 2012, 22 pages.
International Preliminary Report on Patentability for International (PCT) Patent Application No. PCT/EP2012/052497 mailed Aug. 29, 2013, 16 pages.
"Network Security Task Manager: Manual—Installation—Configuration," A. & M. Neuber Software GmbH, 2008, 65 pages.
Chacksfield, "Facebook apps ask for your permission before data mining," TechRadar.com, Jul. 1, 2010 [retrieved on Jun. 14, 2013], 5 pages. Retrieved from: www.techradar.com/us/news/broadband/web/internet/facebook-apps-ask-for-your-permission-before-data-mining-700540.
Cogswell et al., "RootkitRevealer v1.71," Nov. 1, 2006, [Retrieved on Jun. 29, 2012], 5 pages. Retrieved from: http://technet.microsoft.com/en-us/sysinternals/bb897445.aspx.
Srinivasan, "Protecting Anti-Virus Software Under Viral Attacks," Master of Science thesis, Arizona State University, Aug. 2007, 82 pages.
Official Action for U.S. Appl. No. 13/372,433 mailed Aug. 9, 2013, 18 pages.
Official Action for U.S. Appl. No. 13/372,439 mailed Jul. 3, 2013, 16 pages.
Dietrich (2003) Code Project "Event Logging, Part I: XEventLog—Basic NT Event Logging," 10 pages. Available at: http://www.codeproject.com/Articles/3995/Event-Logging-Part-l-XEventLog-Basic-NT-Event-Logg.
Wikipedia as crawled by Wayback Machine on Mar. 1, 2010 "Event Viewer" 6 pages.
Chinese Patent Application No. 201280018306.9, First Office Action mailed Jun. 2, 2015, 26 pages. (No English translation available).
U.S. Appl. No. 12/703,074, Amendment and Response dated Nov. 6, 2012, 8 pages.
U.S. Appl. No. 12/703,074, Amendment after Allowance dated Dec. 7, 2012, 7 pages.
U.S. Appl. No. 13/372,433, Amendment and Response dated Jan. 6, 2014, 13 pages.
U.S. Appl. No. 13/372,433, Final Rejection mailed May 9, 2014, 22 pages.
U.S. Appl. No. 13/372,433, Amendment and Response dated Oct. 9, 2014, 14 pages.
U.S. Appl. No. 13/372,433, Non-Final Rejection mailed Sep. 10, 2015, 16 pages.
U.S. Appl. No. 13/372,439, Amendment and Response dated Nov. 4, 2013, 12 pages.
U.S. Appl. No. 13/372,439, Final Rejection mailed Feb. 24, 2014, 15 pages.
U.S. Appl. No. 13/372,433, Amendment and Response filed Feb. 10, 2016, 18 pages.
Japanese Patent Application No. 2013-553909, Office Action mailed Jan. 26, 2016, 6 pages (English Translation).
Chinese Patent Application No. 201280018306.9, Second Office Action mailed Jan. 11, 2016, 11 pages (English Translation).
Australian Patent Application No. 2012217181, First Examination Report mailed Apr. 11, 2016, 4 pages.
Japanese Patent Application No. 2013-553909, Notice of Allowance mailed May 24, 2016, 3 pages (No English translation available).
U.S. Appl. No. 13/372,433, Final Rejection mailed Jun. 1, 2016, 17 pages.

* cited by examiner

METHODS AND APPARATUS FOR DEALING WITH MALWARE

CLAIM OF PRIORITY UNDER 35 U.S.C. §119

The present Application for Patent claims priority to Provisional Application No. 61/443,095 entitled "METHODS AND APPARATUS FOR DEALING WITH MALWARE" filed Feb. 15, 2011, and assigned to the assignee hereof and hereby expressly incorporated by reference herein.

REFERENCE TO CO-PENDING APPLICATIONS FOR PATENT

The present Application for Patent is related to the following U.S. Patent Applications: co-pending U.S. patent application Ser. No. 13/372,433, entitled "METHODS AND APPARATUS FOR MALWARE THREAT RESEARCH," assigned to the assignee hereof, and expressly incorporated by reference herein; and U.S. patent application Ser. No. 13/372,439, entitled "METHODS AND APPARATUS FOR AGENT-BASED MALWARE MANAGEMENT", now abandoned, assigned to the assignee hereof, and expressly incorporated by reference herein.

BACKGROUND

1. Field

The present invention relates generally to methods and apparatus for dealing with malware. And more specifically, systems and methods for protection against malware.

2. Background

The term "malware" is used herein to refer generally to any executable computer file or, more generally "object", that is or contains malicious code, and thus includes viruses, Trojans, worms, spyware, adware, etc. and the like.

A typical anti-malware product, such as virus scanning software, scans objects or the results of an algorithm applied to the object or part thereof to look for signatures in the object that are known to be indicative of the presence of malware. Generally, the method of dealing with malware is that when new types of malware are released, for example via the Internet, these are eventually detected. Once new items of malware have been detected, then the service providers in the field generate signatures that attempt to deal with these and these signatures are then released as updates to their anti-malware programs. Heuristic methods have also been employed.

These systems work well for protecting against known malicious objects. However, since they rely on signature files being generated and/or updated, there is inevitably a delay between a new piece of malware coming into existence or being released and the signatures for identifying that malware being generated or updated and supplied to users. Thus, users are at risk from new malware for a certain period of time which might be up to a week or even more.

More recently, so-called "cloud" based techniques have been developed for fighting malware/viruses. In these techniques, protection is provided by signatures that are stored in the cloud, i.e. in a central server to which the remote computers are connected. Thus, a remote computer can be given protection as soon as a new malware object is spotted and its signature stored in the central server, so that the remote computer is protected from it without the need to wait for the latest signatures to be downloaded and installed on the remote computer. This technique can also give the advantage of moving the processing burden from the remote computer to the central server. However, this technique is limited by sending only signature information or very basic information about an object to the central server. Therefore, in order to analyse whether or not an unknown object is malware, a copy of that object is normally sent to the central server where it is investigated by a human analyst. This is a time consuming and laborious task introducing considerable delay in classifying malware as safe or unsafe. Also, given the considerable volume of new objects that can be seen daily across a community, it is unrealistic to have a skilled human analyst investigate each new object thoroughly. Accordingly, malevolent objects may escape investigation and detection for considerable periods of time during which time they can carry out their malevolent activity in the community.

We refer in the following to our previous application US-A-2007/0016953, published 18 Jan. 2007, entitled "METHODS AND APPARATUS FOR DEALING WITH MALWARE," the entire contents of which are hereby incorporated by reference. In this document, various new and advantageous cloud-based strategies for fighting malware are disclosed. In particular a cloud-based approach is outlined where the central server receives information about objects and their behaviour on remote computers throughout the community and builds a picture of objects and their behaviour seen throughout the community. This information is used to make comparisons with this data across the community in developing and applying various heuristics and or rules to determine whether a newly seen object is malevolent or not.

This approach to fighting malware involves communicating, storing and managing vast amounts of data at the central server, which is a challenging problem in itself. It is also challenging to develop new schemes for more accurately and more efficiently detecting malware given the vast amount of data collected about objects seen in the community and the constantly evolving strategies used by malware writers to evade detection. It is also desirable to improve the processes for analysing the data to make the best use of the time and specialised skills of the human malware analysts.

Malware is also becoming increasingly adept at self-defence by interfering with the operation of security programs installed on a computer. This is another problem that security software must contend with.

SUMMARY

According to a first aspect of the present invention, there is provided a method of classifying a computer object as malware, the method includes:

at a base computer, receiving data about a computer object from each of plural remote computers on which the object or similar objects are stored and or processed;

wherein the base computer comprises plural threat servers arranged to receive the data from the plural remote computers and apply rules and or heuristics against that data in real time to determine whether or not the object is malware and to communicate the determination to the remote computers;

the base computer further comprising at least one central server in communication with the threat servers and arranged to receive the data about objects from the threat servers to maintain a master database of data received about objects from all of the threat servers.

According to another aspect, an apparatus is provided for classifying a computer object as malware, the apparatus includes a base computer arranged to receive data about a computer object from each of plural remote computers on which the object or similar objects are stored or processed.

The base computer includes plural threat servers arranged to receive the data from the plural remote computers and apply rules or heuristics against that data in real time to determine whether or not the object is malware and to communicate the determination to the remote computers. The base computer also includes at least one central server in communication with the threat servers and arranged to receive the data about objects from the servers to maintain a master database of data received about objects from all threat servers.

According to yet another aspect, a method is provided for connecting a remote computer to one of a plurality of servers. The method includes installing an agent program on the remote computer, the agent program having an algorithm for allocating the remote computer to a server determined by the time when the agent program was installed; and connecting the agent program to the allocated server.

As will become apparent in view of the following disclosure, the various aspects and embodiments of the invention can be combined.

BRIEF DESCRIPTION OF THE DRAWINGS

FIGS. 10 to 13 show graphical user interfaces of an example of a computer program for researching objects according to an embodiment of the present invention;

DETAILED DESCRIPTION

Overview

Figure 1:
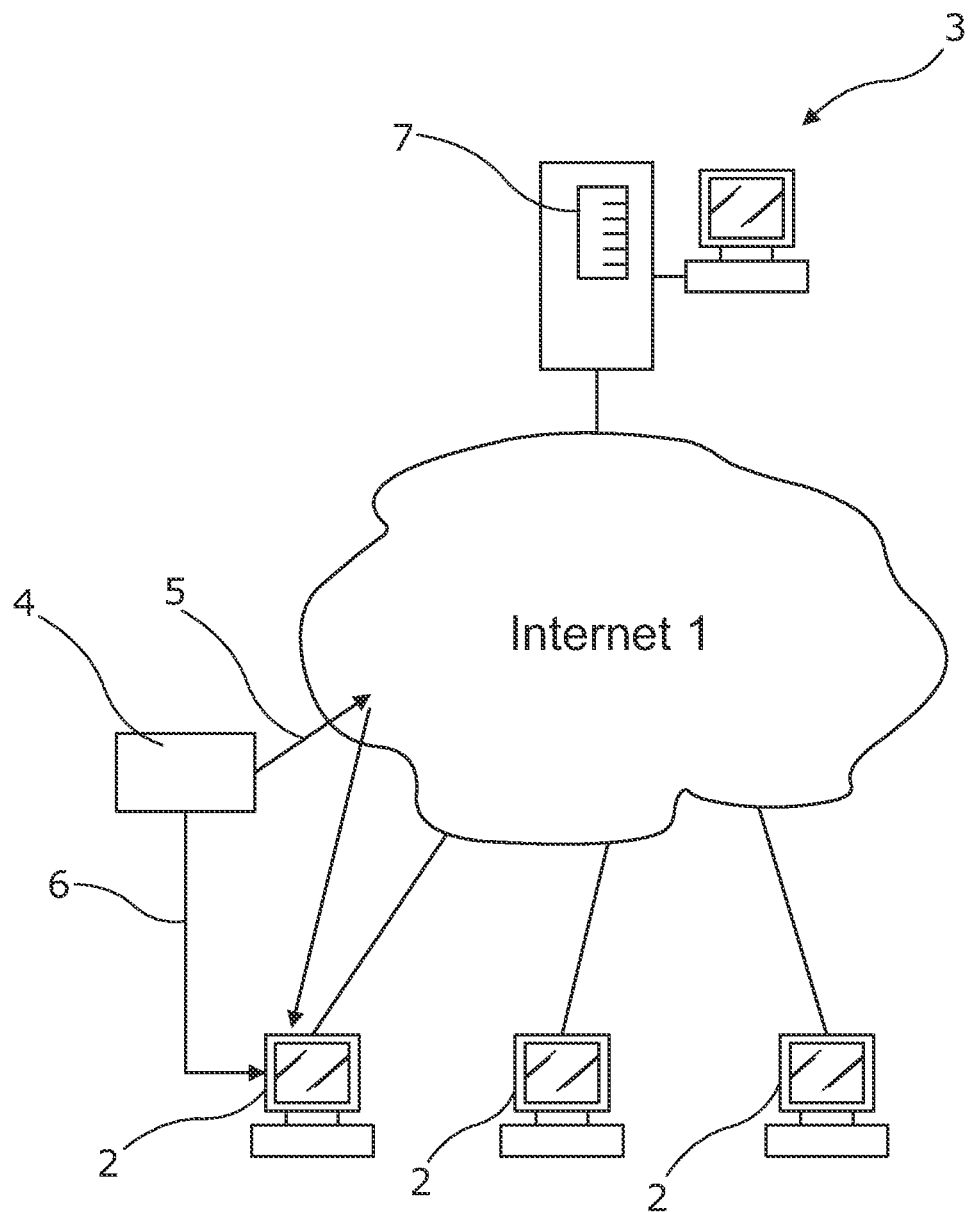
FIG. 1 shows schematically apparatus in which an embodiment of the present invention may be implemented.

Referring to FIG. 1, a computer network is generally shown as being based around a distributed network such as the Internet 1. Embodiments of the present invention may however be implemented across or use other types of network, such as a LAN. Plural local or "remote" computers 2 are connected via the Internet 1 to a "central" or "base" computer 3. The computers 2 may each be variously a personal computer, a server of any type, a PDA, mobile phone, an interactive television, or any other device capable of loading and operating computer objects. An object in this sense may be a computer file, part of a file or a sub-program, macro, web page or any other piece of code to be operated by or on the computer, or any other event whether executed, emulated, simulated or interpreted. An object 4 is shown schematically in the figure and may for example be downloaded to a remote computer 2 via the Internet 1 as shown by lines 5 or applied directly as shown by line 6. The object 4 may reside in computer RAM, on the hard disk drive of the computer, on removable storage connected to the computer, such as a USB pen drive, an email attachment, etc.

In one exemplary embodiment, the base computer 3 is in communication with a database 7 with which the remote computers 2 can interact when the remote computers 2 run an object 4 to determine whether the object 4 is safe or unsafe. The community database 7 is populated, over time, with information relating to each object run on all of the connected remote computers 2. As will be discussed further below, data representative of each object 4 may take the form of a so-called signature or key relating to the object, its attributes and behaviour.

Figure 2:
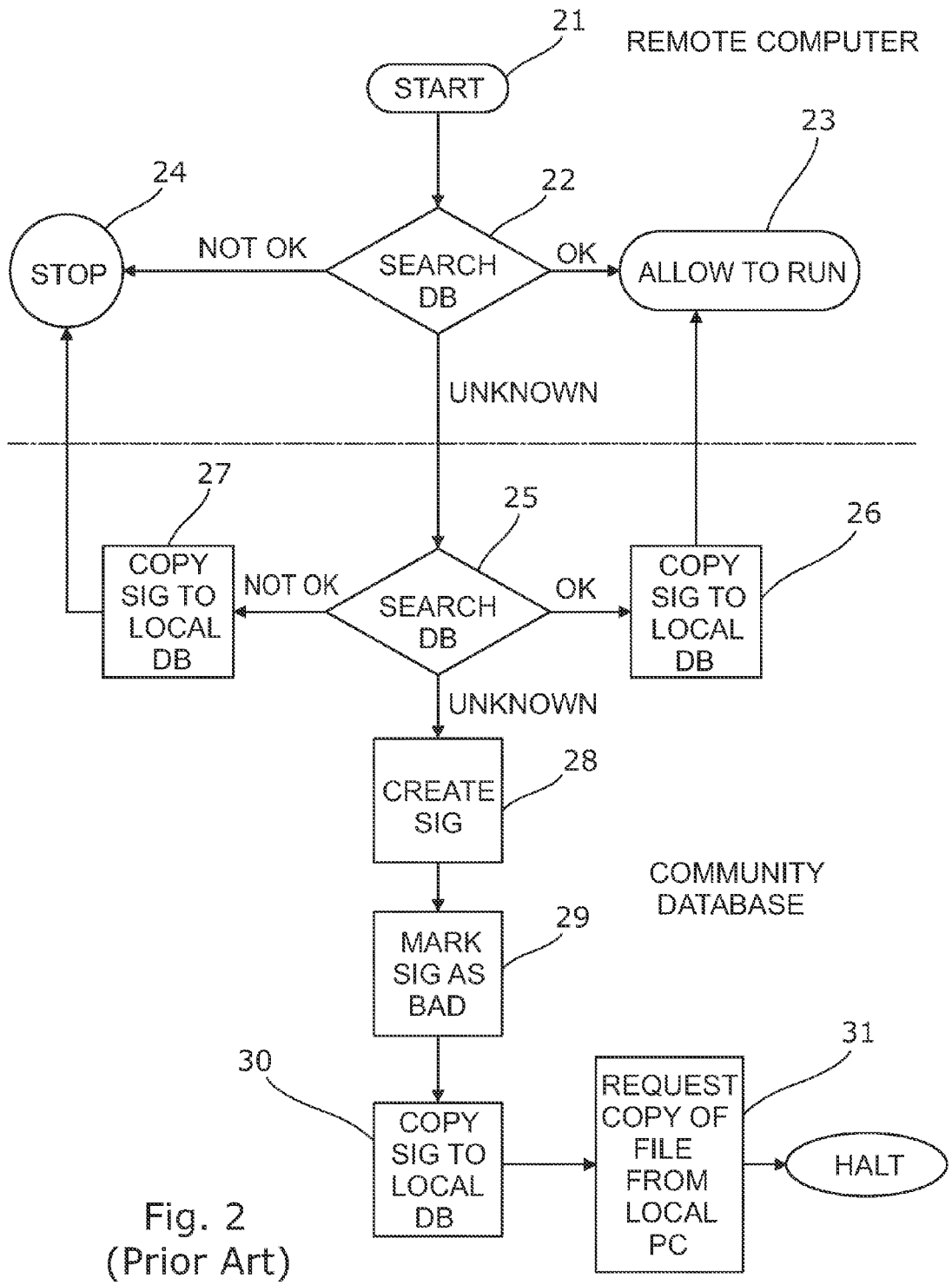
FIG. 2 is a flowchart showing schematically the operation of an example of a method according to an embodiment of the present invention.

Referring now to FIG. 2, at the start point 21, a computer object 4 such as a process is run at a remote computer 2. At step 22, by operation of a local "agent" program or software running on the remote computer 2, the operation of the process is hooked so that the agent program can search a local database stored at the remote computer 2 to search for a signature or key representing that particular process, its related objects and/or the event. If the local signature is present, it will indicate either that the process is considered to be safe or will indicate that that process is considered unsafe. An unsafe process might be one that has been found to be malware or to have unforeseen or known unsafe or malevolent results arising from its running. If the signature indicates that the process is safe, then that process or event is allowed by the local agent program on the remote computer 2 to run at step 23. If the signature indicates that the process is not safe, then the process or event is stopped at step 24.

It will be understood that there may be more than two states than "safe" or "not-safe" and choices may be given to the user. For example, if an object is considered locally to be not safe, the user may be presented with an option to allow the related process to run nevertheless. It is also possible for different states to be presented to each remote computer 2. The state can be varied by the base computer to take account of the location, status or ownership of the remote computer or timeframe.

Furthermore, the agent software at the remote computer 2 may be arranged to receive rules or heuristics from the base computer 3 for classifying objects as safe or unsafe. If the object is unknown locally, the agent software may apply the rules or heuristics to the details of the object to try to classify the object as safe or unsafe. If a classification is made, details of the object and classification are passed to the base computer 3 to be stored in the community database 7. This means that the agent software is capable of providing protection against previously unseen objects even if it is "offline", e.g. it is unable to connect to the base computer for any reason. This mechanism is described in more detail later in the disclosure.

If the object is still not classified locally, then details of the object are passed over the Internet 1 or other network to the base computer 3 for storing in the community database 7 and for further analysis at the base computer 3. In that case, the community database 7 is then searched at step 25 for a signature for that object that has already been stored in the community database 7. The community database 7 is supplied with signatures representative of objects, such as programs or processes, run by each monitored remote computer 2. In a typical implementation in the field, there may be several thousands or even millions of remote computers 2 connected or connectable to the base computer 3 and so any objects that are newly released upon the Internet 1 or that otherwise are found on any of these remote computers 2 will soon be found and signatures created and sent to the base computer 3 by the respective remote computers 2.

When the community database 7 is searched for the signature of the object that was not previously known at the remote computer 2 concerned, then if the signature is found and indicates that that object is safe, then a copy of the signature or at least a message that the object is safe is sent to the local database of the remote computer 2 concerned at step 26 to populate the local database. In this way, the remote computer 2 has this information immediately to hand the next time the object 4 is encountered. A separate message is also passed back to the remote computer 2 to allow the object to run in the current instance.

If the signature is found in the community database 7 and this indicates for some reason that the object is unsafe, then again the signature is copied back to the local database and marked "unsafe" at step 27, and/or a message is sent to the remote computer 2 so that running of the object is stopped (or it is not allowed to run) and/or the user given an informed choice whether to run it or not.

If after the entire community database 7 has been searched the object is still unknown, then it is assumed that this is an entirely new object which has never been seen before in the field. A signature is therefore created representative of the object at step 28, or a signature sent by the remote computer 2 is used for this purpose.

At this point, rules or heuristics may be applied by the base computer 3 to the details of the object to try to classify the object as safe or unsafe. If a classification is made, the signature is marked as safe or unsafe accordingly in the community database 7. The signature is copied to the local database of the remote computer 2 that first ran the object. This mechanism is described in more detail later in the disclosure.

If the object is still not classified, the signature may be initially marked as bad or unsafe in the community database 7 at step 29. The signature is copied to the local database of the remote computer 2 that first ran the object at step 30. A message may then be passed to the remote computer 2 to instruct the remote computer 2 not to run the object or alternatively the user may be given informed consent as to whether to allow the object to run or not. In addition, a copy of the object itself may be requested at step 31 by the community database 7 from the remote computer 2.

If the user at the remote computer 2 chooses to run a process that is considered unsafe because it is too new, then that process may be monitored by the remote computer 2 and/or community database 7 and, if no ill effect occurs or is exhibited after a period of time of n days for example, it may then be considered to be safe. Alternatively, the community database 7 may keep a log of each instance of the process which is found by the many remote computers 2 forming part of the network and after a particular number of instances have been recorded, possibly with another particular number of instances or the process being allowed to run and running safely, the signature in the community database 7 may then be marked as safe rather than unsafe. Many other variations of monitoring safety may be done within this concept.

The database 7 may further include a behaviour mask for the object 4 that sets out the parameters of the object's performance and operation. If an object is allowed to run on a remote computer 2, even if the initial signature search 22 indicates that the object is safe, then operation of that object may be monitored within the parameters of the mask. Any behaviour that extends beyond that permitted by the mask is identified and can be used to continually assess whether the object continues to be safe or not.

The details of an object 4 that are passed to the base computer 3 may be in the form of a signature or "key" that uniquely identifies the object 4. This is mainly to keep the data storage and transmission requirements as minimal as possible. This key may be formed by a hashing function operating on the object at the remote computer 2.

The key in the exemplary embodiment is specially arranged to have at least three severable components, a first of the components representing executable instructions contained within or constituted by the object, a second of the components representing data about the object, and a third of the components representing the physical size of the object. The data about the object in the second component may be any or all of the other forms of identity such as the file's name, its physical and folder location on disk, its original file name, its creation and modification dates, resource information such as vendor, product and version, and any other information stored within the object, its file header or header held by the remote computer 2 about it; and, events initiated by or involving the object when the object is created, configured or runs on the respective remote computers. In general, the information provided in the key may include at least one of these elements or any two or more of these elements in any combination.

In one embodiment, a checksum is created for all executable files, such as (but not limited to) .exe and .dll files, which are of the type PE (Portable Executable file as defined by Microsoft). Three types of checksums are generated depending on the nature of the file:

Type 1: five different sections of the file are check summed. These include the import table, a section at the beginning and a section at the end of the code section, and a section at the beginning and a section at the end of the entire file. This type applies to the vast majority of files that are analysed;

Type 2: for old DOS or 16 bit executable files, the entire file is check summed;

Type 3: for files over a certain predefined size, the file is sampled into chunks which are then check summed. For files less than a certain predefined size, the whole file is check summed.

For the check summing process, in principle any technique is possible. The MD5 (Message-Digest algorithm 5) is a widely-used cryptographic hash function that may be used for this purpose.

This allows a core checksum to be generated by viewing only the executable elements of the checksum and making a comparison between two executables that share common executable code.

For the type 1 checksum mentioned above, three signature processes may be used. The first defines the entire file and will change with almost any change to the file's content. In particular, the first defines a representative sampling of the contents of the program in that if any fundamental change is made to the program, the checksum will change, but trivial changes can be identified as such, allowing correlation back to the original program body. The second attempts to define only the processing instructions of the process, which changes much less. The third utilises the file's size, which massively reduces the potential of collisions for objects of differing sizes. By tracking the occurrences of all signatures individually appearing with different counterparts, it is possible to identify processes that have been changed or have been created from a common point but that have been edited to perform new, possibly malevolent functionality.

As well as checksum data, in many embodiments metadata about the object is captured and sent to the base computer 3. Amongst other types, the types of metadata captured and sent to the base computer 3 might be:

"Events": these define the actions or behaviours of an object acting upon another object or some other entity. The event may include three principal components: the key of the object performing the act (the "Actor"), the act being performed (the "Event Type"), and the key of the object or identity of another entity upon which the act is being performed (the "Victim"). For example, the event data might capture the identity, e.g. the IP address or URL, of a network entity with which an object is communicating, another program acting on the object or being acted on by the object, a database or IP registry entry being written to by the object, etc. While simple, this structure allows a limitless series of behaviours and relationships to be defined. Examples of the three components of an event might be:

| Actor | Event Type | Victim |
|---|---|---|
| Object 1 | Creates Program | Object 2 |
| Object 1 | Sends data | IP Address 3 |
| Object 1 | Deletes Program | Object 4 |
| Object 1 | Executes | Object 2 |
| Object 2 | Creates registry key | Object 4 |

"Identities:" these define the attributes of an object. They include items such as the file's name, its physical location on the disk or in memory, its logical location on the disk within the file system (its path), the file's header details which include when the file was created, when it was last accessed, when it was last modified, the information stored as the vendor, the product it is part of and the version number of the file and it contents, its original file name, and its file size.

"Genesisactor": the key of an object that is not the direct Actor of an event but which is the ultimate parent of the event being performed. For example in the case of a software installation, this would be the key of the object that the user or system first executed and that initiated the software installation process, e.g. Setup.exe.

"Ancillary data": many events may require ancillary data, for example an event such as that used to record the creation of a registry run key. In this situation the "event" would identify the Actor object creating the registry run key, the event type itself (e.g. "regrunkey"), and the Victim or subject of the registry run key. The ancillary data in this case would define the run key entry itself; the Hive, Key name and Value.

"Event Checksums": because the event data can be quite large extending to several hundred bytes of information for a single event, its identities for the Actor and Victim and any ancillary data, the system allows for this data itself to be summarised by the Event Checksums. Two event checksums are used utilising a variety of algorithms, such as CRC and Adler. The checksums are of the core data for an event. This allows the remote computer 2 to send the checksums of the data to the central computer 3 which may already have the data relating to those checksums stored. In this case, it does not require further information from the remote computer 2. Only if the central computer 3 has never received the checksums will it request the associated data from the remote computer 2. This affords a considerable improvement in performance for both the remote and central computers 2,3 allowing much more effective scaling.

Thus, the metadata derived from the remote computers 2 can be used at the community database 7 to define the behaviour of a process across the community. As mentioned, the data may include at least one of the elements mentioned above (file size, location, etc.) or two or three or four or five or six or all seven (or more elements not specifically mentioned here). The data stored in the community database 7 provides an extensive corollary of an object's creation, configuration, execution, behaviour, identities and relationships to other objects or entities that either act upon it or are acted upon by it. This may be used accordingly to model, test and create new automated rules and heuristics for use in the community database 7 and as rules that may be added to those held and used in the local database of the remote computers 2 to identify and determine the response of the remote computers 2 to new or unknown processes and process activity.

Moreover, it is possible to monitor a process along with any optional sub-processes as a homogenous entity and then compare the activities of the top level process throughout the community and deduce that certain, potentially malevolent practices only occur when one or more specific sub-processes are also loaded. This allows effective monitoring (without unnecessary blocking) of programs, such as Internet Explorer or other browsers, whose functionality may be easily altered by downloadable optional code that users acquire from the Internet, which is of course the principal source of malevolent code today.

Distributed Architecture

The system as described so far is generally as described in our previous application US-A-2007/0016953. There now follows a description of new, advantageous schemes in operating such a system. It will be appreciated that in the description in relation to FIGS. 1 and 2 the central computer and the community database are presented for convenience as single entities. As will be apparent from the following discussion, the base computer 3 can be comprised of multiple computers and servers, etc. and the community database 7 can be made up multiple databases and storage distributed around this central system.

Figure 3:
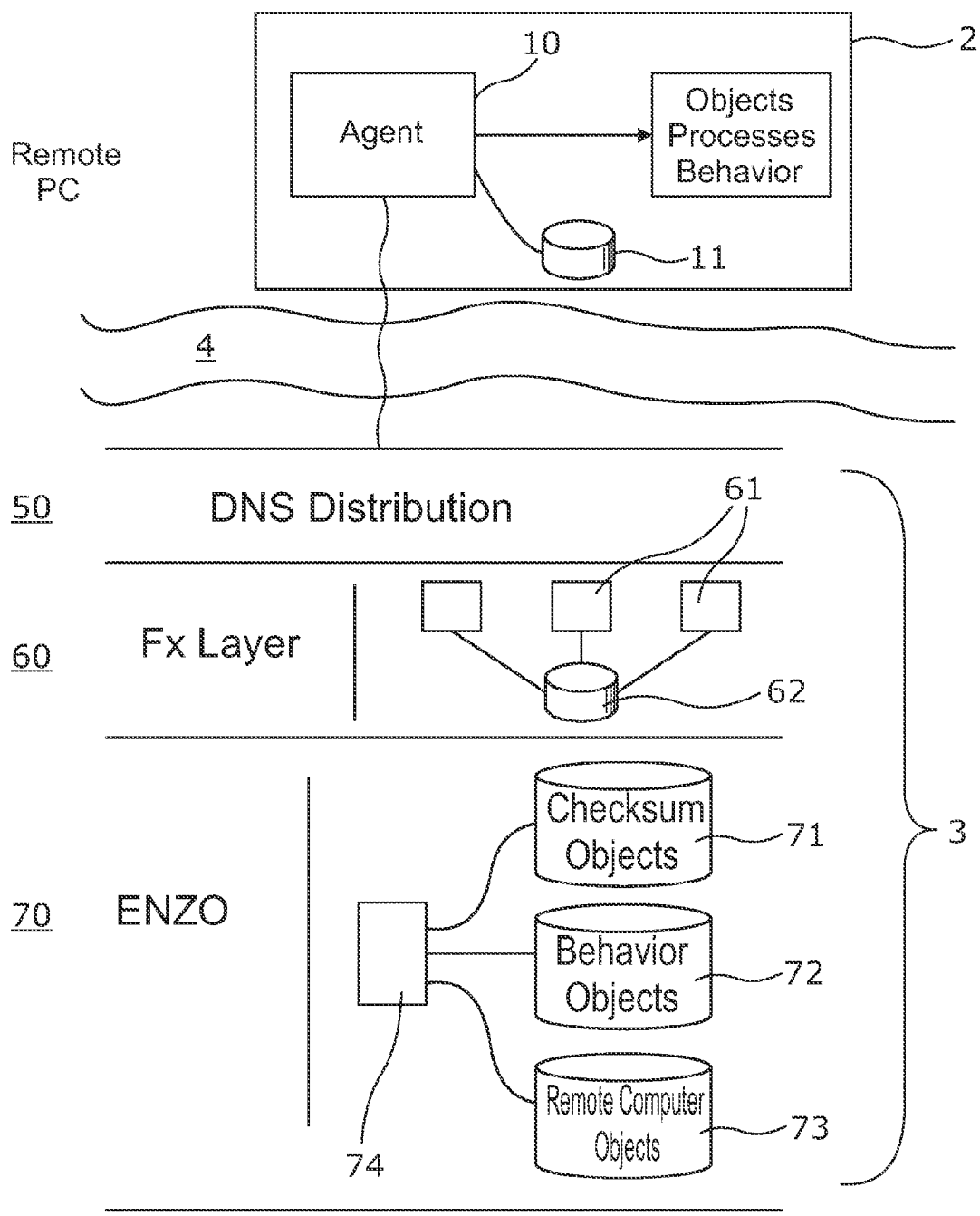
FIG. 3 shows a more detailed view of an example of a base computer 3 according to an embodiment of the present invention.

FIG. 3 shows an example of an arrangement for the base computer 3. The remote computer 2 has an agent program 10, which generally includes the same functionality as the agent program described above in relation to FIGS. 1 and 2. In short, the agent program 10 the monitors objects on that computer 2 and their behaviour and communicates with the base computer 3 to send details of new objects and behaviour found on the remote computer 2 and to receive determinations of whether the objects are safe or not. The agent program 10 optionally communicates with a local database 11, which holds a local copy of signatures relating to the objects found on the remote computer 2.

The agent program 10 can be comparatively small compared with other commercially available anti-malware software. The download size for the agent program 10 can be less than 1 MB and occupy about 3 MB of memory when running, using more memory only to temporarily hold an image of a file(s) being scanned. In comparison, other anti-malware packages will typically have a download of 50 MB and occupy 50 MB to 200 MB of computer memory whilst scanning files. Thus, the exemplary architecture can occupy less that 2% of system resources compared with other products.

This is achieved primarily by the exemplary agent program 10 being developed in a low-level language, having direct access to system resources such as the video display, disk, memory, the network(s), and without the incorporation of many standard code or dynamic linked libraries to perform these functions. Memory usage is optimised by storing data in the local database structure that provides the ability to refer to objects by a unique identifier rather than requiring full filenames or signatures. All unnecessary dynamic link libraries are unloaded from the process immediately as they are identified as no longer being used, and background threads are merged to reduce CPU usage. A small, efficient agent can be deployed more quickly and can used alongside other programs, including other security programs, with less load on or impact on the computer's performance. This approach also has the advantage of having less surface area for attack by malware making it inherently more secure.

The agent program 10 communicates with the base computer 3 over the Internet 1 via the Internet's Domain Name Resolution System (DNS) 50.

The base computer 3 has a first layer comprising one or more servers 61, which in this example are web servers. In the present disclosure, the web servers 61 are referred to as "FX servers" or "threat servers" and the first layer is referred to as the "FX layer". However, it will be appreciated that any type of suitable server may be used according to need. The remote computers 2 are allocated to one of the web servers 61 as explained in more detail below.

The FX layer 60 makes real time decisions as to whether or not an object is benign or malevolent based on the details of that object sent from the remote computer 2. Each web server 61 of the FX layer 60 is connected to a database 62 which contains entries for all of the objects known to the base computer 3 and a classification of whether the object is safe or unsafe. The database 62 also stores rules for deciding whether unknown objects are safe or unsafe based on the information received from the remote computer 2. The web server 61 first searches the database 62 for matching signatures to determine if the object is safe or unsafe or unknown. As described above, the signature can be a function of the hashes (checksum data) derived from file itself, event data involving the object and or metadata about the object in any combination. If the object is unknown, the web server 61 then determines if any of the rules classify the object as unsafe. The web server 61 then communicates back to the remote computer 2 whether the object is safe and can be allowed to run, unsafe and is to be prevented from running, or unknown in which case the object can be allowed to run or not according to user preference.

Thus, the FX layer 60 reacts in real time to threats to determine whether or not malware should be allowed to run on a remote computer 2.

Sitting behind the FX layer 60 is a second layer (called the "ENZO layer" 70 herein). Information about objects received by the FX layer 60 from the remote computers 2 is sent to the ENZO layer 70 such that a master record is maintained at the ENZO layer 70 of all data received from all remote computers 2. This process is described in more detail below.

The ENZO layer 70 has one or more servers 74 (referred to as "central servers" or "ENZO servers" in this disclosure) connected to one or more "master" databases which aggregate all of the information received from all web servers 61 from all remote computers 2. The databases may comprise any combination of the following three databases and in one exemplary embodiment has all three.

1) An object database 71, which has entries containing object signatures (e.g. their MD5 checksums) and including metadata received about objects, e.g. file name, file location, or any other metadata collected by the system as described above.

2) A behaviour database 72 for capturing details of the behaviour of objects observed on a remote computer 2. This database 72 is populated by the event data sent from the remote computers 2 and allows a picture to be built up of the behaviour and relationships an object has across the community.

3) A computer-object database 73 which associates remote computers 2 in the community with objects observed on those remote computers 2 by associating objects with identification codes sent from the remote computer 2 during object detail transmission. The computer may be identified by at least the following three identifiers sent from the remote computer: one which relates to the physical system, one which relates to the operating system instance and one which relates to the logged on user.

As will be appreciated, in a community having for example 10 million or more remote computers 2, each having on average hundreds to thousands of objects, each having a large number of behaviours and associations with other objects, the amount of data held in the databases 71,72,73 is enormous.

The ENZO servers 74 can query the databases 71,72,73 and are operable, either by automation or by input from a human analyst or both, in monitoring object behaviour across the community and in investigating objects and developing rules for spotting malware. These rules are fed back to the FX layer 60 and or the agent program 10 running on remote computers 10 and, as discussed elsewhere in this document, are used by the web servers 61 or the agent program 10 in real time to stop malware from running on remote computers 2. The performance of those rules in accurately stopping malware on the remote computers 2 is fed back to the ENZO layer 70 and can be used to refine the rules. The techniques used are described further in the following disclosure.

In an exemplary embodiment, some or all of the servers 61,74 and databases 62,71,72,73 of the FX and ENZO layers 60,70 are implemented using cloud computing. Cloud computing is a means of providing location-independent computing, whereby shared servers provide resources, software, and data to computers and other devices on demand. Generally, cloud computing customers do not own the physical infrastructure, instead avoiding capital expenditure by renting usage from a third-party provider. Cloud computing users avoid capital expenditure on hardware, software, and services when they pay a provider only for what they use. New resources can quickly be put on line. This provides a large degree of flexibility for the user.

An example of cloud computing is the Amazon Elastic Compute Cloud (EC2), which is a central part of the Amazon.com cloud computing platform, Amazon Web Services (AWS). Another example is the Windows Azure Platform, which is a Microsoft cloud platform that enables customers to deploy applications and data into the cloud. EC2 is used in the present example to provide cloud computing. Nonetheless, it will be appreciated that, in principle, any suitable cloud architecture could be used to implement the base computer 3. Alternatively conventional data centres could be used to implement the base computer 3, or a mixture of conventional data centres and cloud-based architecture could be used.

EC2 allows users to rent virtual computers on which to run their own computer applications. EC2 allows scalable deployment of applications by providing a web service through which a user can boot an Amazon Machine Image to create a virtual machine, which Amazon calls an "instance," containing any software desired.

A user can create, launch, and terminate server instances as needed, paying by the hour for active servers, allowing the provision of "elastic" computing. EC2 provides users with control over the geographical location of instances, which allows for latency optimization and high levels of redundancy. For example, to minimize downtime, a user can set up server instances in multiple zones which are insulated from each other for most causes of failure such that one backs up the other. In this way, the cloud provides complete control of a user's computing resources and its configuration, i.e. the operating system and software packages installed on the resource. Amazon EC2 allows the user to select a configuration of memory, CPU, instance storage, and the boot partition size that is optimal for the operating system and application. EC2 reduces the time required to obtain and boot new server instances to minutes, allowing the user to quickly scale capacity, both up and down, their computing requirements change.

Figure 4:
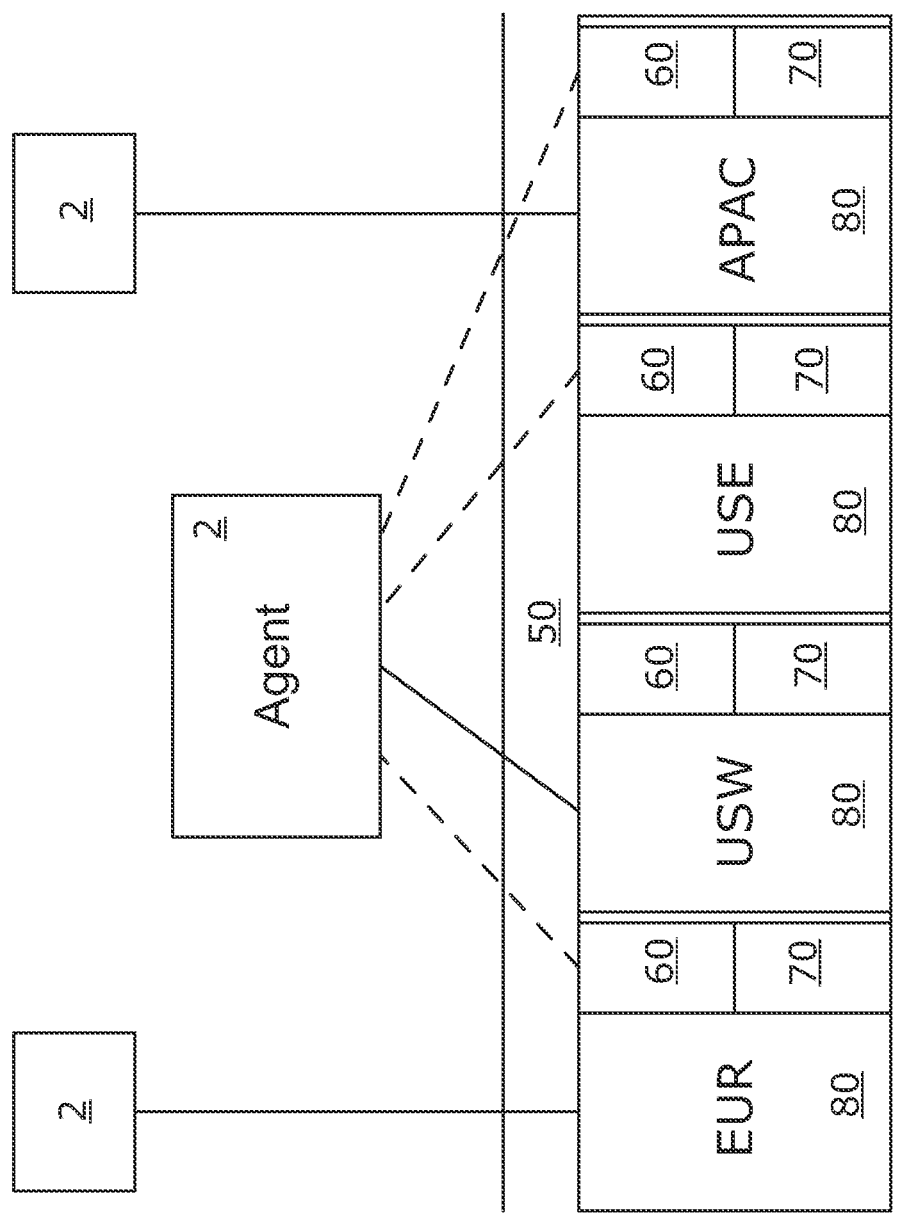
FIG. 4 shows an example where web servers are located in different geographical locations.

EC2 maintains a number of data centres in different geographical regions, including: US East Coast, US West Coast, EU (Ireland), and Asia Pacific (APAC) (Singapore). As shown by FIG. 4, in an exemplary embodiment, the servers and databases of the base computer 3 are implemented in plural of these geographical locations 80.

The important question therefore arises of how to allocate remote computers 2 to a particular instance of web server 61 in the FX layer 60. Important considerations in this decision are to minimise latency and to share the load evenly across the web servers. Ideally, the load on resources would be shared approximately equally across all instances of web servers in order to avoid web servers being under utilised and to minimise the number of web servers required. It is also desirable to implement a simple solution which does not add significantly to the speed or size of the agent program 10 on the remote computers, or place an overhead on the base computer 3.

1) In an exemplary embodiment, the agent program 10 uses the geographical location of the remote computer 2 in allocating the remote computer 2 to a web server 61, i.e. based on its proximity to a geographical region 80 of the cloud. The location of the remote computer can be determined by any convenient means, such as examining the IP address of the remote computer 2 against a database of known location ranges, or performing a network route analysis to determine the number of "hops" required to reach the destination server. This functionality can be performed by the agent program 10 running on the remote computer 2 when it is first installed on the computer 2. And by allocating based on location, latency can be minimised.

2) In an exemplary embodiment, the agent program 10 generates a random number based on the date and time of its installation seeded with unique identifiers of the remote computer to decide to which web server 61 it should be mapped. This provides a simple, pseudo random way of mapping remote computers 2 to web servers 61, which shares the load evenly between web servers 61 even if several thousand remote computers are being installed simultaneously.

3) The DNS distribution layer then maps the URL to the physical data centre. The Domain Name System (DNS) is a hierarchical naming system built on a distributed database for computers, services, or any resource connected to the Internet or a private network. It associates various information with domain names assigned to each of the participating entities. The DNS distribution network 50 allows load balancing to plural servers 61 making up the FX layer 60.

Any combination of these techniques can be used by the agent program 10 to allocate a remote computer 2 to a web server 61. And all three may be used in combination.

The agent program may also utilize a secondary algorithm to re-map the remote computer 2 to different URL in case the primary URL is unavailable for any reason, e.g. if the servers go down. Also, in the event that malware has been able to disable the DNS mechanism then the agent program 10 can make direct contact with the FX servers 61 by referring directly to a series of direct IP addresses reserved for this purpose.

Optionally, the agent program 10 is arranged so that it can reassign the remote computer 2 to a different server 61 by receiving feedback/instruction from the server 61 the computer is already connected to. This can be used to add central control to the allocation of agent program 10 to servers 61, which adds more flexibility to the system.

Thus, this scheme allows a simple, agent managed way of dynamically load balancing between servers and providing resiliency, whilst dealing with geographical location. In known prior art arrangements, specialised hardware load balancers are employed in the network to divide load to other servers, or else agents are manually allocated to web servers 61 when the agent program 10 is installed.

Using a cloud-based distributed architecture for the base computer 3 presents challenges in trying to maintain integrity of data across the servers and in managing the update of data across the many servers. As will be clear from the foregoing, the web servers 61 in a typical implementation will be dealing with huge amounts of data. There will be large amounts of commonality in the data, which can be used for determining rules on what objects are malware. However, it is impractical to store all data on all web servers 61 on all regions. This presents a problem in determining whether or not the data is common in real time.

To address these issues, an exemplary embodiment adopts the following scheme. Each web server 61 in the FX layer 60 examines an incoming packet of data from a remote computer 2 about an object seen on that remote computer 2. The agent program 10 generates a checksum of the data packet and sends it to the web server 61. The web server 61 has a database 62 of objects that have previously been seen and which have already been sent to the ENZO server 74. The web server 61 checks its database 62 for the checksum of the incoming data. If the checksum is found, then the data has already been seen by the ENZO server 74. In this case, the web server 61 just increases the count associated with that checksum in its database of the number of times that data has been seen to assist in determining the popularity of a piece of software or the frequency of the occurrence of a specific event. This information can then be forwarded to the ENZO server 74. If the checksum is not found in the FX database 62, then the web server requests the full data packet from the remote computer and then forwards this to the ENZO server 74. The ENZO server 74 then stores this data in the appropriate databases 71,72,73. Thus, the ENZO layer 70 keeps a master list in the object database 71 of all data objects, their metadata and behaviour seen on all of the remote computers 2. This master list is propagated back to all of the web servers 61 in all of the geographical locations 80. Thus, all web servers 61 are updated with information about which objects have been seen by the community.

This scheme has been found to reduce workload and traffic in the network by a factor of about 50 compared with a conventional scheme where typically each piece of data on being received by a web server would immediately be propagated to all other servers in the system.

It is desirable that the data held in the master databases 71,72,73 in the ENZO layer 70 provide scalability, accessibility and resilience to the data for users. It will be appreciated that if just one live ENZO server 74 is used, then if that server becomes inaccessible, all live data is lost. For this reason, in many embodiments at least one ENZO server 74 resides in each region 80 of the cloud to provide redundancy. This means that the web servers 61 are not all directly linked to the same ENZO server 74, but rather the web servers 61 are only linked to the ENZO server 74 in their own region 80. This creates a need for an extensible method of providing data to multiple database servers.

Figure 5:
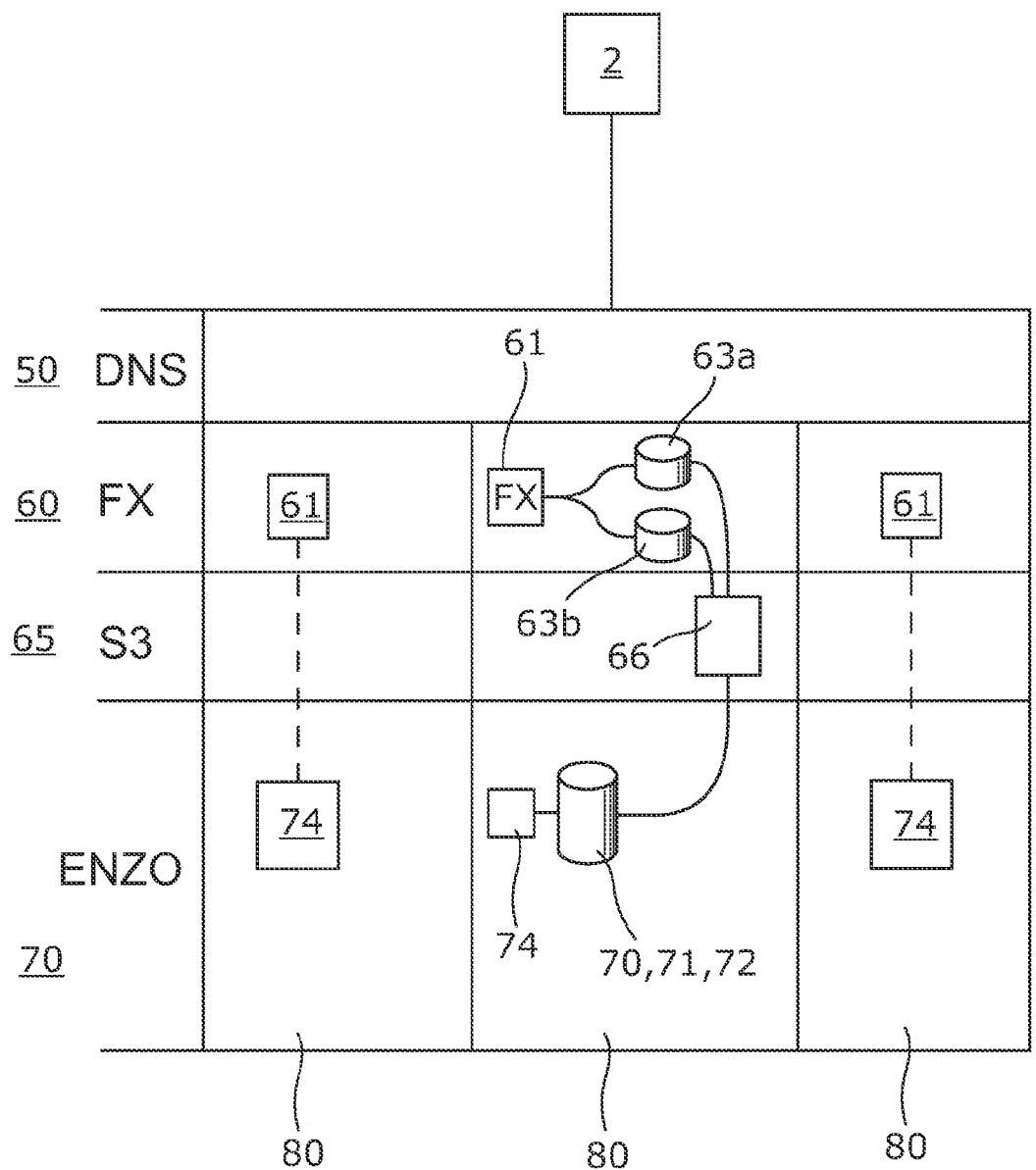
FIG. 5 shows schematically the apparatus of FIG. 3 in more detail and in particular the way in which data can be moved from the FX layer to the ENZO layer in an embodiment.

FIG. 5 shows schematically a scheme of updating data from a web server 61 to an ENZO server 74. Each web server 61 has two temporary databases 63a, 63b linked to it. At an initial starting point, one database 63a is part full 63b (active) and the other is empty (inactive). As information about objects is received from a remote computer 2 by the web server 61, it posts the information into the active database 63a. This information will be checksum information received from the remote computers 2 about objects or events seen on the remote computer. If the checksum is previously unseen at the web server, the associated data about that object or event is posted to the database along with its checksum.

Once the active database 63a reaches a predetermined size or some other predetermined criteria is met, the contents of the active database 63a are put into long term storage 66 together with a time stamp of the point in time when this happens. While this is occurring, the inactive database 63b is made active and starts to fill with new data as it arrives, and the formerly active database 63a is cleared and made inactive. Again, when this database is full, then the process of time stamping and moving the contents of the database to long term storage is repeated and the databases are swapped over. In some embodiments, the FX layer 60 has a S3 sub-layer 65, which is responsible for managing input/output to the long term storage 66. S3 (Simple Storage Service) is an online storage web service offered by Amazon Web Services. S3 is an Amazon service for the storage of high volume data in a secure and non-volatile environment through a simple web services interface. S3 is used to store the history of the FX server data being sent from the FX servers to the ENZO servers. When a block of data is put into long term storage 66, the S3 layer 66 also forwards this data to the ENZO server 74 or servers so that the ENZO server can update its databases. All FX servers feed all ENZO servers via the S3 storage service.

Figure 6:
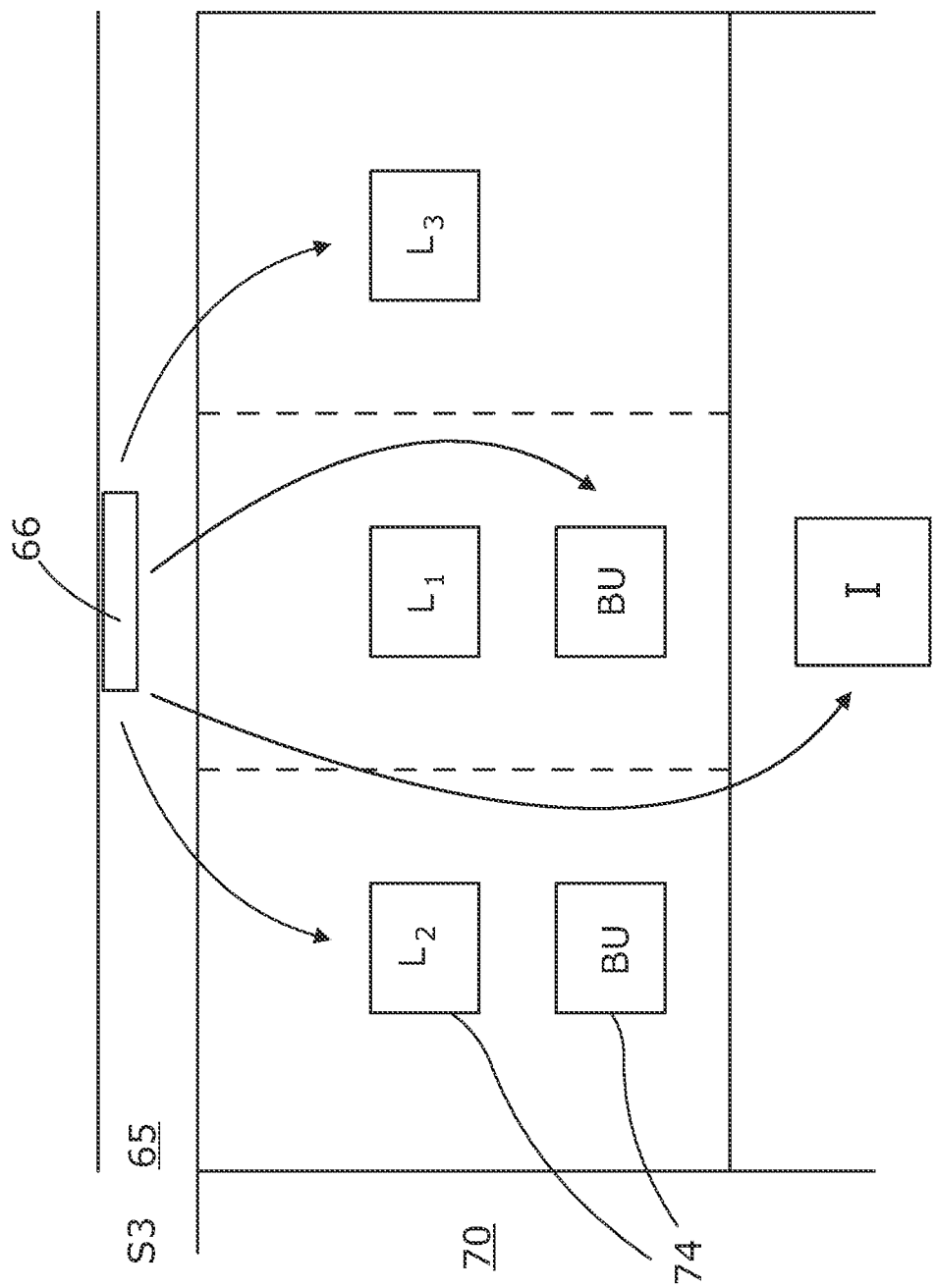
FIG. 6 shows schematically an example in which a new instance of an ENZO server is created in accordance with an embodiment of the invention.

The databases 63a,63b may be emptied into long term storage 66 for example every few minutes or even every few seconds. However, as will be appreciated, the actual time period used can be selected according to the load and size of the databases and may be chosen dynamically based on for example the load on the database or the size of the data. Thus, the S3 layer 65 holds all of the data received by all of the web servers 61 in the community. This has a number of advantages as illustrated by FIG. 6.

Firstly, this can be used to allow the master ENZO databases 71,72,73 to be rebuilt for example in the event that an ENZO server 74 develops a problem. Also, if the data held by an ENZO server 74 is corrupted somehow, for example by a problem in a software upgrade on the ENZO server 74, it is possible to roll back the databases at the ENZO server 74 to a point before the corruption occurred. By using the timestamps associated with the blocks of data in the S3 layer 65, the ENZO server 74 can request the data blocks in long term storage 66 at the S3 layer 65 to be resent to the ENZO server 74 so the server's databases 71,72,73 can be brought up to date.

Furthermore, using this scheme, the ENZO servers 74 in multiple regions 80 can create backup databases of the ENZO databases by receiving the data from the S3 layer. This can be done without affecting the live ENZO databases 74, so these can carry on functioning seamlessly.

The alternative would be to post to databases at a single ENZO server which is designated the master server and to propagate the data from the master server to other servers in the community. However, this in effect creates one "live" server and one or more backups. The live server therefore does most of the work, e.g. pre-processing data received from the agents, updating the databases and analysing the data for threats, whilst the backup servers are under utilised. Thus, the live server must be more powerful than the backup servers. This tends to be wasteful and inefficient of resources. In comparison, the exemplary embodiment, shares the workload around the servers equally.

It is also desirable for operators, human malware analysts, etc., to have a copy of the data from a live server for research, etc. Image servers may be created in the same way as the live servers and the backup servers. The user of the system can take the image server offline when he needs to take an image for offline use. Once the image is taken, the image database can be brought up to date using the blocks of data from the S3 layer.

Cloud computing can recreate instances of web servers very quickly, e.g., in a matter of minutes. Cloud computing is therefore advantageous in implementations where the volume of transactions grows (or shrinks). In this situation, a new server instance can be quickly created to handle the new load. However, it is necessary to take an image of a live server to create the image. This is disruptive to the processes running on that instance during imaging. It is therefore clearly not acceptable to take a live server out of commission for this period. Therefore, in many embodiments, a special dedicated image server is maintained behind the ENZO server, which is updated in a similar way to the live and backup servers. In this case, the image server is taken off-line and imaged. This process might take for example 30 minutes. During this time, the image server is not receiving updates from the S3 server and therefore becomes out of date. However, since the exact time when the server went off line is known, it can be updated by requesting data blocks from the S3 server with a timestamp later than when it went off line. Thus, an image can be taken of an updated server for offline use etc. and brought back up to date without affecting the running of the system.

Figure 7:
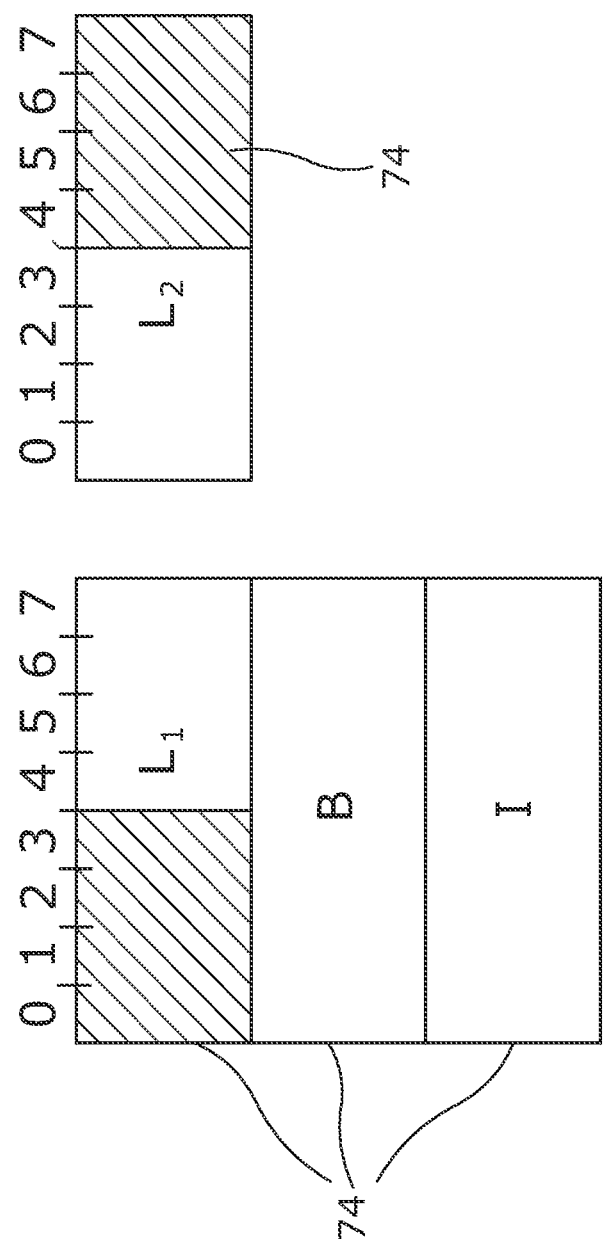
FIG. 7 shows schematically an example of apparatus by which an ENZO server shares out its workload between plural servers in accordance with an embodiment of the invention.

It is also desirable to be able to scale out the architecture of the ENZO layer 70. For example, a live server 74 may be running out of processing power due to the increase in traffic it is seeing from web servers 61 or agents 10. For example, more remote computers 2 may be connected to the system, or a common software package may be updated leading to a large volume of new data being sent to the ENZO layer 70. In this situation, a second or further live server instance can be created in the ENZO layer 70 in order to scale out horizontally (as opposed to adding more CPU/RAM to an existing server). As described above, it is relatively straightforward to create an image of an ENZO server 74 in a cloud-computing environment. As can be seen from FIG. 7, the data on each server 74 is divided into a plurality of sections. In this case the data on the server 74 is divided into eight sections 0-7. Each section does a share of the processing on that server. When the server is divided, various sections are allocated to each server. So, for example, in the example of FIG. 7, the original server L1 processes data 0-3, and the newly created server L2 processes data 4-7. Each server then handles pre-processing and storing its own data. For the purposes of analysing the data, in many embodiments the data from these multiple severs is aggregated so that the human analyst is working on the complete set of data when investigating malware (as described in more detail below). Of course, the data can be divided in different ways among the servers according to need.

So, instead of holding a single database and then having to dissect it if it is required to distribute the load across multiple servers, in many embodiments the database is already dissected making it is much easier to make a transition to further distribution of the database workload across multiple servers.

The number of data sections may be selected to be eight, because this is enough to give reasonable flexibility and ability to expand. However, it is rare that a business needs to expand by more than 800% at any time. Nonetheless, other plural numbers of data sections can be used as appropriate.

This architecture allows vast amounts of data to be managed across multiple locations and servers. The architecture can be scaled and servers copied without incurring extra work or affecting the running of the system. The data can be exchanged across servers that can change dynamically.

Using Trend Data

Malware evolves at a significant pace. Historically, malware used a single infection (module or program) to infect many computers. As this allowed malware researchers to quickly become aware of the infection, signatures could be quickly deployed to identify and block the threat. In the last decade, malware authors have made their threats contain many varied modules, which shared a common purpose. To detect and block these new threats is a much greater challenge for malware research and to creating and distributing signatures to identify and block all of the variations, any one of which could infect one or more computers. Due to the varied and distributed nature of these modern threats malware researchers are often late in identifying that a threat even exists.

By collecting hashes, signatures and statistics of new programs and modules correlated by path and file details, and aggregating this information at a central location, it is possible to use a method of analysis that will allow faster identification of new threats.

On any given day the amount of new commercial programs and modules that are created can be considered almost constant. This data can be measured against any of the metadata or event data collected about the object. In one example, the data is measured against the Path (Folder) location of new files created. The data can also be measured against their filenames, and file types (e.g. .exe, .dll, .drv, etc.) along with details such as vendor, product and version information, registry keys, or any other system derived data forwarded to base computer. Any combination of these factors is possible. In whichever way it is chosen to group the data, by establishing a baseline for the pattern and distribution of this data across the groups it is possible to quickly identify outliers.

Figure 8:
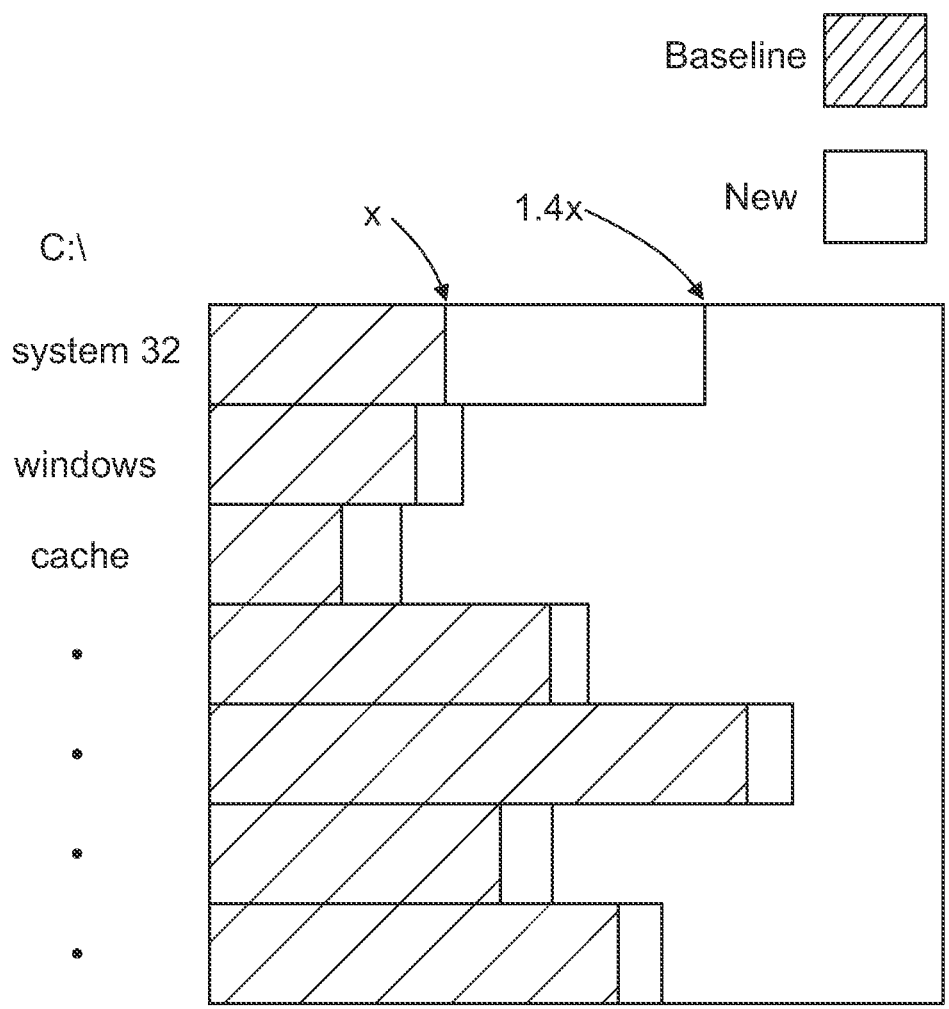
FIG. 8 is a chart showing an example of a scheme for analysing data about objects according to an embodiment of the present invention.

FIG. 8 shows an example of collected data over a time period grouped according to folders in the file system compared with the established normal distribution (base line). If the number of new programs in the windows system32 subfolder is normally x in any given time period t (e.g., in a given day) and in a particular time period t1 under consideration it is 1.4x (or exceeds some other predetermined ratio) then it indicates an abnormal increase in the number of new files which signifies possible malware activity. This identification allows greater focus to be placed on researching these outliers. Processes can be readily developed that can use this outlier information to automatically group, identify or prioritise research effort and even make malware determinations. Where automated rules are used to identify malware, this information can be used to automatically heighten sensitivity of these rules when applied to objects in the group that has been identified as an outlier.

Another example of this technique is to focus on a filename and compare the number of new objects (as represented by its hash) that utilize that name, or the number of new objects all of which have new names. This is contrary to the general principles of most commercial software, which needs consistency to enable manageability of their products. Most commercial applications have only a few names and each file name has only a few variants as each new release is made available. In contrast, some malware has thousands of variants using the same, similar or similarly structured name and which are observed by the community utilising the related names within a very short window of time (e.g., seconds-weeks).

In principle, any length of time for the window can be selected. In practice, this is likely to be of the order of every 15 minutes, or every few hours, or a day, rather than longer periods like every week.

In some embodiments, techniques are provided to provide context for researchers. In detecting malware, human analysts and computer automated analysis have different strengths and are often used together to some degree to harness the capabilities of both. Computers are good at applying rules to and processing large amounts of data. In the present application, the amount of data received from agent program 10 running on remote computers 2 is vast and therefore suited to being processed by computer. It would be impractical to have human operators to look at all of this data to determine malware. On the other hand, experienced human analysts are highly adept at spotting malware given the appropriately focussed data about that object and similar objects and their context. Often a human analyst can "intuitively" spot malware, in a way that is difficult to reduce to a set of rules and teach to a machine. For example, kernel32.dll is a file associated with the Windows® operating system. A malware program may be called something similar, e.g. kernel64.dll, which would immediately be apparent to a user as being suspicious, but which it would be difficult to teach a machine to spot.

Figure 9:
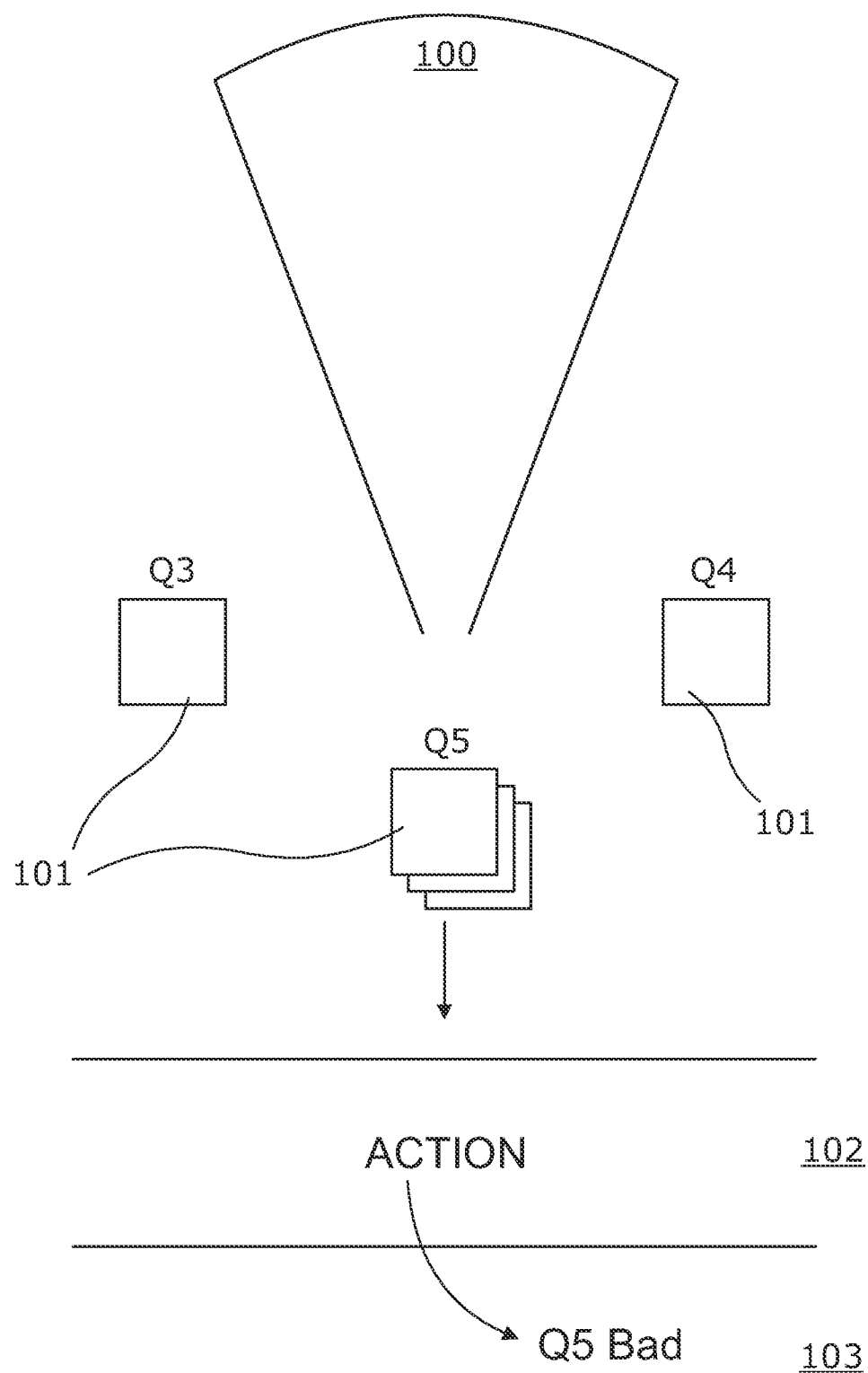
FIG. 9 show shows schematically an example of a scheme for processing data about objects according to an embodiment of the invention.

The pattern may be obvious in retrospect when an analyst is presented with the relevant data. However, this is a rear view mirror approach. The problem is finding the relevant data in the vast amount of data being received at the base computer 3 so that the analyst can focus his/her time on the important data. As illustrated by FIG. 9, what is needed is somewhat of distilling the raw data 100 into groups of related data 101 to provide a focussed starting point for a malware researcher to investigate and take necessary action 102 to flag objects bad or safe 103 accordingly.

As will be appreciated, a single object on a remote computer 2 across the community can have a high degree of associations with other objects on remote computers 2. Some tools currently exist which can map links between entities to create a network of associations. However, when used for a malware object and its associations with other objects, these will result in a diagram that is so dense and complicated that it is practically useless for the purpose of allowing a human analyst to identify malware. The problem is sifting this data so useful features are extracted for the analyst so that he can quickly focus on the likely candidates for being malware.

Figure 10:
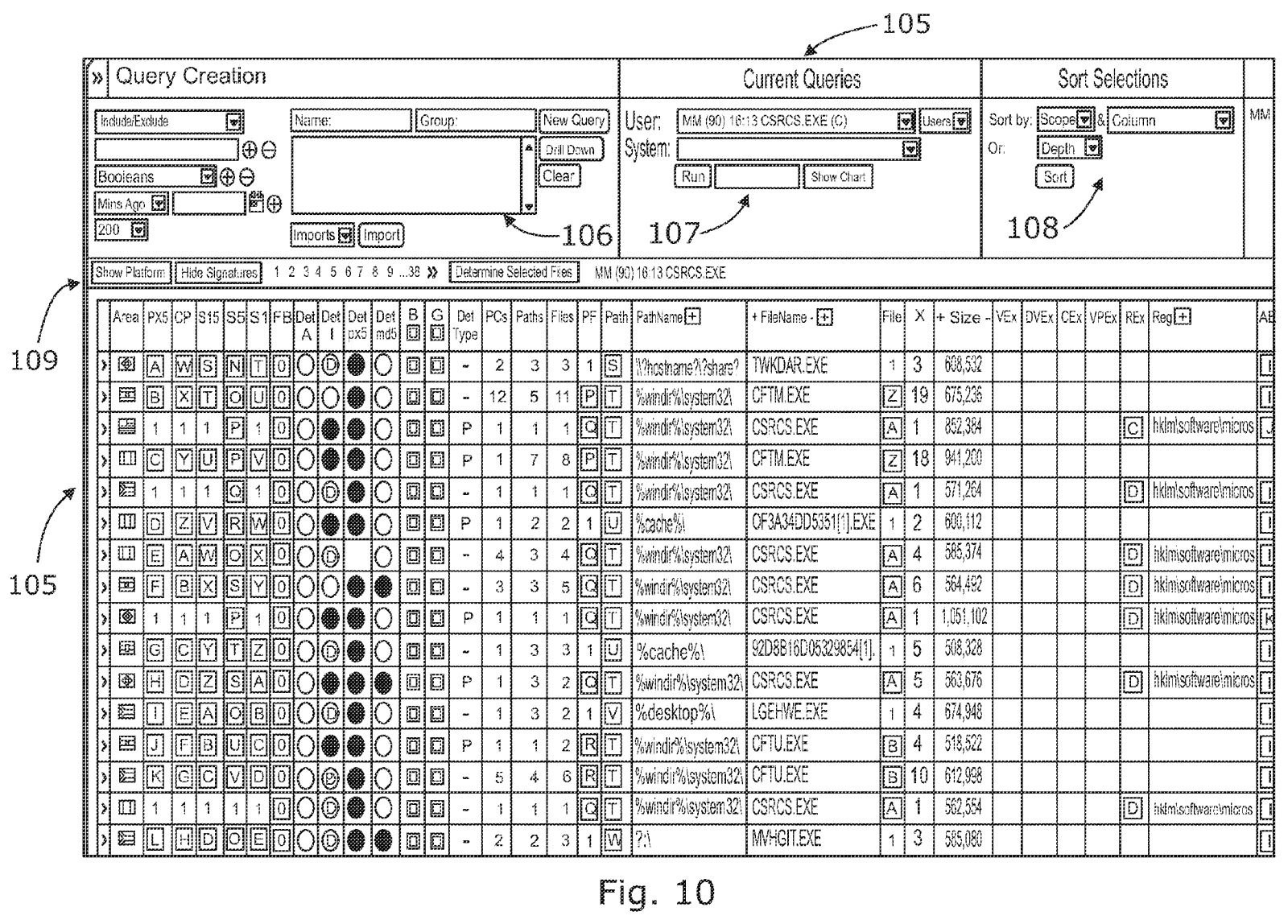

An exemplary embodiment, illustrated by FIGS. 10 to 13, provides a software program running on the ENZO server 74 and giving the user a visual based tool for running queries against the databases. A query language such as TSQL may be used for example to query the database based on the user's input. As mentioned in the foregoing, the ENZO layer 70 has a complete record of the properties and activities of all objects seen on all remote computers 2 in their databases. FIG. 10 shows an example of an on-screen display and user interface including a table 105 in which the rows represent the objects (determined by their signatures) that match the results of the current query. The user interface provides tools for creating new queries 106, for displaying current and recent queries 107 and for sorting the data displayed in the table for the current query 108. Clearly there may be more results than will fit on one screen. There may therefore be more than one page of results to which the user can navigate through appropriate controls 109 provided by the user interface.

The table 105 has a plurality of columns of data representing information about the objects. The information may include any of the data collected about an object, its metadata or its behaviour, sent to the base computer 3 by the remote computers 2. This may include any of the following for example: the name of the file, and the location (path) of the file, the country where the object was first encountered, the identity of the remote computer that encountered the object, its operating system and version number, details of the web browser and any other security products installed on the computer, the creator of the file, the icon associated with the file, etc. The information may include metadata about the file, such as the author or the size of the object or information relating to executable instructions in the object. The data may contain "actor" and "victim" information and details of its registry key. The information may include information about whether or not the object has been identified as safe or unsafe at the remote computer 2 or at the FX server 61.

The information displayed may contain counts of how often a particular attribute is present among all the objects returned by the query or across the community. In addition, the information may contain less easily understood information. As discussed above, the information collected about an object can include checksums of parts of the executable, e.g. the first 500 bytes of the executable part of the file. In many cases, the actual value of the checksum or other data is of little or no interest to the user. Therefore, in many implementations some or all of this information is presented to the user in a graphical way, utilising colour, shape and or different symbols, which makes spotting patterns in the data more intuitive and speedy for the user.

In some embodiments, at least one column of data is presented according to the following scheme:
1) if the value is unique in that column between the rows of data representing objects then the numeral "1" is presented.
2) if the value is replicated between the rows of data on the screen, or between all the rows of data matching that query, then a coloured symbol (e.g. a green triangle or a red letter "P" in a blue square, etc.) is allocated for that value and displayed in that column for all rows that share that value. Thus, without needing to know what the symbols represent, the user can see at a glance which rows on the screen have commonality of an attribute.

This provides a starting point for running further queries. For example, the user can quickly see commonality between objects, which look interesting. As explained elsewhere in this document, a typical trait of malware is that the objects use a large number of file names, file locations, similar file sizes, similar code portions, etc. The program allows a user to refine a query by for example clicking on columns in the table and using the query creating tools 106 to add a particular attribute value to the predicate of the query, or to start a new query with this column value in the predicate, etc.

Figure 11:
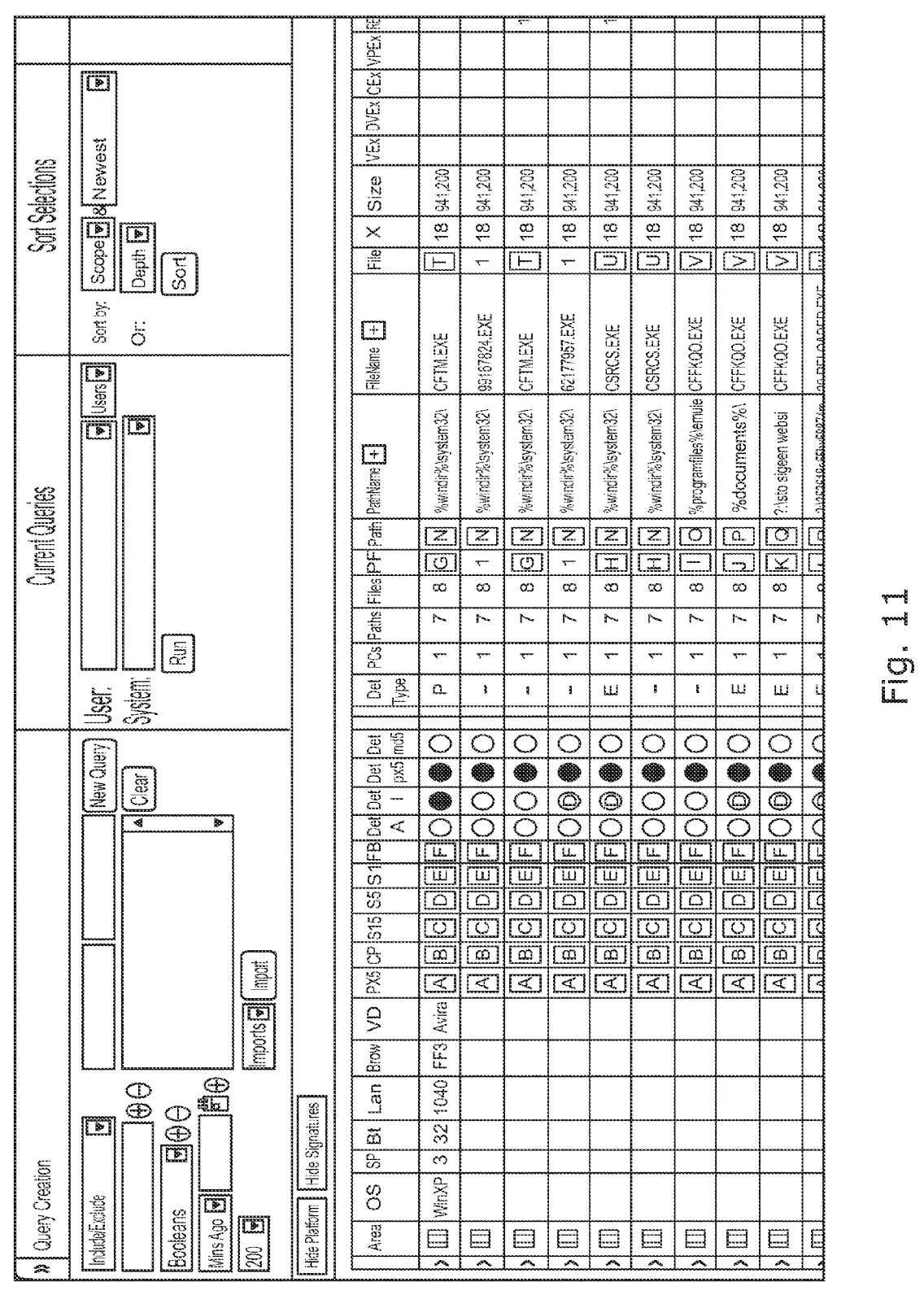
Figure 12:
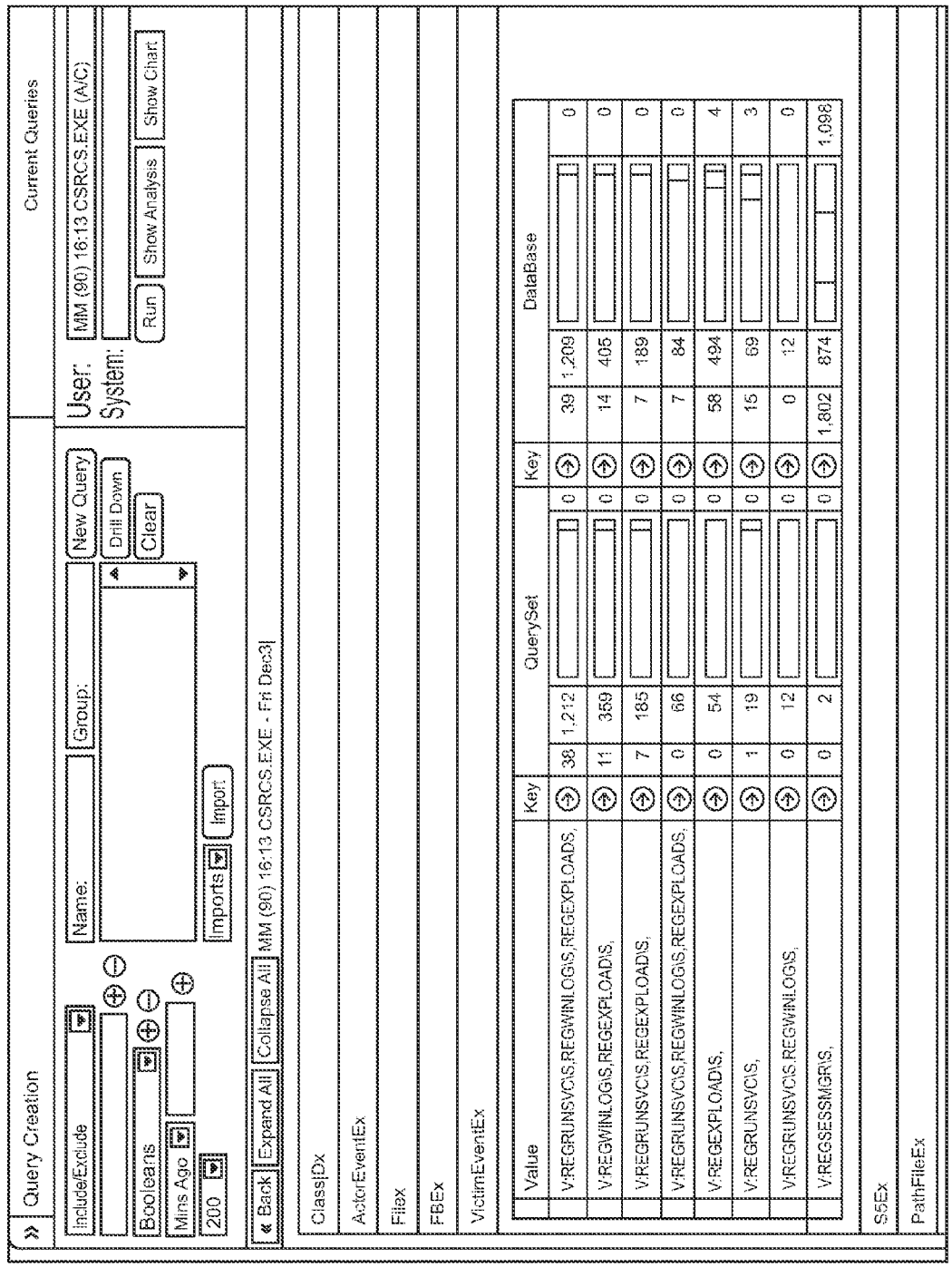
Figure 13:
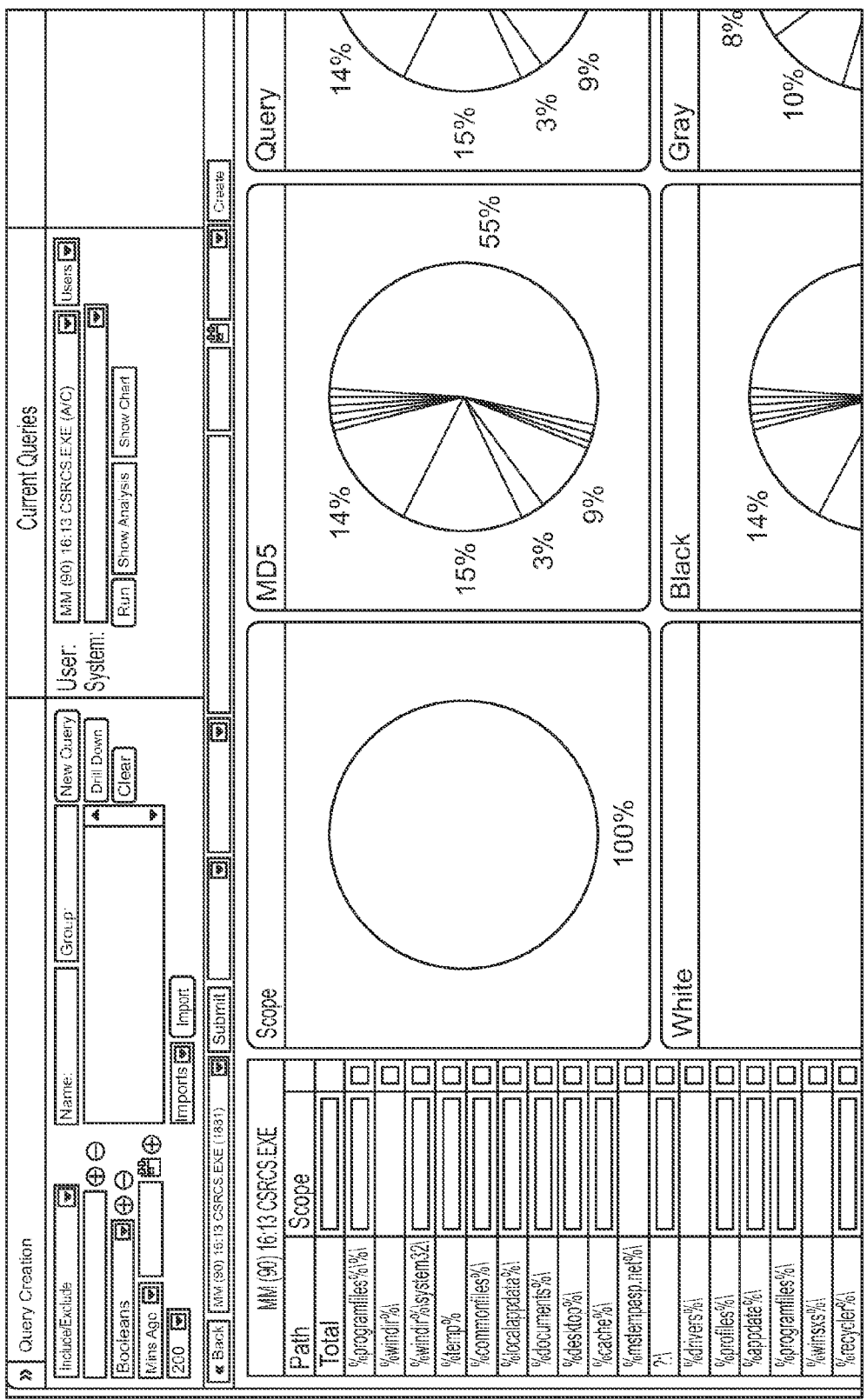

The ultimate aim of this process is for the user to find a query that returns the maximum number of rows with commonality. By this process, the user identifies a set of criteria made up of hashes and other metadata definitions that can be used to accurately identify similar objects that share criteria. For example, FIG. 11 shows a user query that returns rows with a high degree of commonality representing objects that have commonality. The software also in many implementations allows the user to bring up a screen of statistics for the objects that have been returned from the query. In particular, as shown by FIG. 12, the interface can display to the user the number of objects returned by the query that are known to the database as being malware, the number known as being not malware, and the number where it is not yet known whether or not the object is malware (represented in FIG. 12 by differently shaded/coloured bars). Other data about the results of a query or objects having a certain attribute selected by the user can be shown in graphical form, e.g. a bar graph, or a pie diagram as shown in FIG. 13. The user can take this information into account as well as information shown in the table 105 when deciding whether or not the results of the query determine malware. The user can then take the appropriate action, such as tagging the objects returned by the query as malware, not malware, or suspicious and requiring further investigation. Thus, by being able to query and analyse the collective view of an object, i.e. its metadata and behaviours, across all agents 10 that have seen it, a more informed view can be derived, whether by human or computer, of the object. In addition it is possible to cross-group objects based on any of their criteria, i.e. metadata and behaviour.

To take an example, it might be a previously identified trait of certain types of malware that the malevolent object is located in the "recycle bin" of the operating system. This gives a starting point for the user to run a query to find all objects, or all objects encountered during a user specified time frame, that are located in the recycle bin by looking at their "path" attribute. This would display rows to the user corresponding to the different objects found (e.g. each row corresponding to a different MD5 signature). The user can then drill down through the rows by selecting interesting attributes by clicking on a value in a column. For example, the user may choose objects whose attributes show that the object's icon is the same as the icon used the "Notepad" program (which comes with Microsoft Windows® operating systems), but which are not Microsoft originating programs. In many implementations the system allows the user to apply Boolean operators in refining the query. The system allows the user to bring up statistics of how well the query cover objects that are known by the system to be malevolent or benign to give the user more information about useful the query is in classifying objects.

The users employed in grouping objects according to this scheme need not be highly skilled malware analysts. The users need only basic training in use of the tool and in grouping objects by running queries and looking for commonality. The final analysis of objects covered by the query can be taken by a skilled malware analyst. The advantage of this system is that the computer is doing the work in processing the raw data which is too large of a task to be practical for a human operator to complete. The human operators grouping the data need not be skilled, which reduces costs for the business. This reduces costs and leaves the skilled malware analysts to concentrate on queries that are found to be good candidates for further investigation. Thus, the skill of these operators is most effectively deployed in using their experience to identify malware.

Referring to FIG. 9, if at stage 103 the user decides that a query (Q5) is deterministic in classifying the objects returned by a query as safe or unsafe, then the rule can be passed back to the web servers 61 and or the agent program 10 at the remote computers 2 and used in real time in deciding whether new objects seen at the web servers 61 or remote computer 2 are safe or unsafe.

If a new object that has not been seen before by the community is received by a remote computer 2 or a web server 61 and is deemed by one of the rules run by the remote computer 2 or web server 61 to be unsafe, the object can be stopped from running on the remote computer 2 in real time, or the user of the remote computer 2 can be warned and given the option of continuing or not. Furthermore, the remote computer 2 (via the web server 61 to which it is assigned) or the web server 61 can report to the ENZO server 74 that a new object has been determined to be safe or unsafe by the rule. The ENZO server 74 can update its master database with this finding and this finding can be communicated to other remote computers 2 and or web servers 61 and used to update their databases that objects with that signature are unsafe and should be blocked in the future, or safe and should be allowed to run.

Alternatively, the rule can be used by human analyst at the ENZO layer to monitor suspicious objects. Objects covered by the rule can be displayed to a human analyst and the analyst can then decide for each object in turn whether it is malevolent or benign, and mark the object accordingly. These determinations for each object are sent back to the web servers 62 and or agent software 10 and used to decide whether or not the object is allowed to run when encountered at the remote computers in real time. This method does not react as quickly to new threats, compared with applying the rules in real time at the web servers 62 and or agent software 10. However, it may be preferred in cases where it is desired to keep the number of "false positives" low, and or where a rule is found to be good at identifying suspicious objects which need further investigation before a firm determination can be made that they are malware.

Furthermore, this action can be semi automated. The application can monitor the groupings along with any and all actions taken such as groups being determined as malicious or as benign. By tracking these actions it is possible for the ENZO server 74 to learn from human analysts how to identify and determine objects automatically. The application can remember queries that have been run by users. If the same query is being run repeatedly by a user and returning malware objects, or if a researcher consistently takes the action of determining the objects to be malware, then the system can automatically identify this condition and create a rule of the criteria and the action to determined matching objects as malicious. This rule can be sent to the FX server layer 60 to enable real time actions to be made to catch objects that match the rule and determine them as malicious. The identity of these rules and of malware grouping applied by the rules can then be fed back to both the agent and the ENZO server 74. In this way the FX server 61 is performing an action sanctioned and distributed by the ENZO server 74, on its behalf. Similarly, these same processes can be applied to benign groups of objects resulting in rules that determine such objects as "good" which can be propagated back to the FX layer 60 in the same way for the rules for "bad" objects. Thus, the ENZO layer 70 allows the user to easily identify these groupings. The ENZO layer can then monitor the groupings along with any and all actions taken such as groups being determined as malicious or as benign. By tracking these actions it is possible for the ENZO layer 70 to learn from humans how to identify and determine objects automatically.

The ENZO layer 70 can also monitor trends and bring information to the human analysts' attention, such as the evolution in the behaviour of a previously known good program. For example, a legitimate version of the game Solitaire will be observed by the ENZO servers to have a particular behaviour profile from the actions performed by that program on remote computers over a period of time. If after a period of time that program starts exhibiting new, suspicious behaviour, such as trying to install a driver or accessing a web server in another country, this can be flagged for investigation.

Furthermore, an exemplary embodiment of the agent program 10 at the remote computer provides an interface that allows the user to report "false positives" to the system, i.e. where an object has been flagged as malware, which the user believes to be legitimate software. The system is arranged to feedback this information to the ENZO server 74. At this point, the system can determine that the rule is no longer reliably deterministic in finding malware and can disable the rule. Alternatively the system can flag the rule for manual review and or modification by a human analyst. Alternatively, it can be decided that the rule is generally useful despite the false positive and that the false positive is an outlier. The conflicting benign object can then be specifically excluded from the rule at the FX layer 70 by placing it on a white list.

It should be noted that rules can be prioritised (applied in order by priority) and can be established to only apply against objects having a specific determination, location, popularity, age or any other criteria known by or derived by the database. For example, if a first rule determines the object originates from Microsoft, then it may be decided not to apply any further rules. In contrast, if a first rule determines that an object is suspicious, then it may be decided to apply further rules as appropriate.

Thus, many embodiments of the software application running on an ENZO server 74 provide powerful object behaviour monitoring and assessment. The software allows the user to obtain a thorough understanding of an object's behaviour on a remote computer and the contextual environment in which it is observed, in part through providing powerful data visualisation techniques. The software enables large research teams to work collaboratively and incrementally and leverages human research skills and experience through expert system automation.

Configurable Firewall

It is desirable to stop malware before a computer becomes infected, e.g., when the infected file is received by email, downloaded, or when it is installed or run for the first time.

A well known example of a malware program is the "Zeus" Trojan. This program runs in the background on an infected computer and steals login details as they are entered on screen by a user by monitoring the user's keystrokes. This information is then sent to the criminal's servers where it can be used to take control of the infected computer. An instant message is sent to the criminal over the network when the malware program detects logon information being entered on an online banking website, so the criminal receives this information in near real time. The Trojan can then take remote control of the user's computer using the Virtual Network Connection protocol, a protocol that allows a remote user to access and take control of a computer remotely. The criminal can then steal money from the victim's bank account.

While most anti-malware software attempts to stop the malware from infecting a host computer or stopping communications with the malware as soon as possible, not much attention has been shown to finding and prosecuting the criminals responsible. One difficulty is that it is illegal for the anti-malware or even the police to hack into the criminal's servers to find the criminal's data. Indeed, it is a known ruse for the criminals to use so-called "botnets", which are "zombie networks" of legitimate users' computers which have been infected by malware and are thereby under the control of the criminals.

Figure 14:
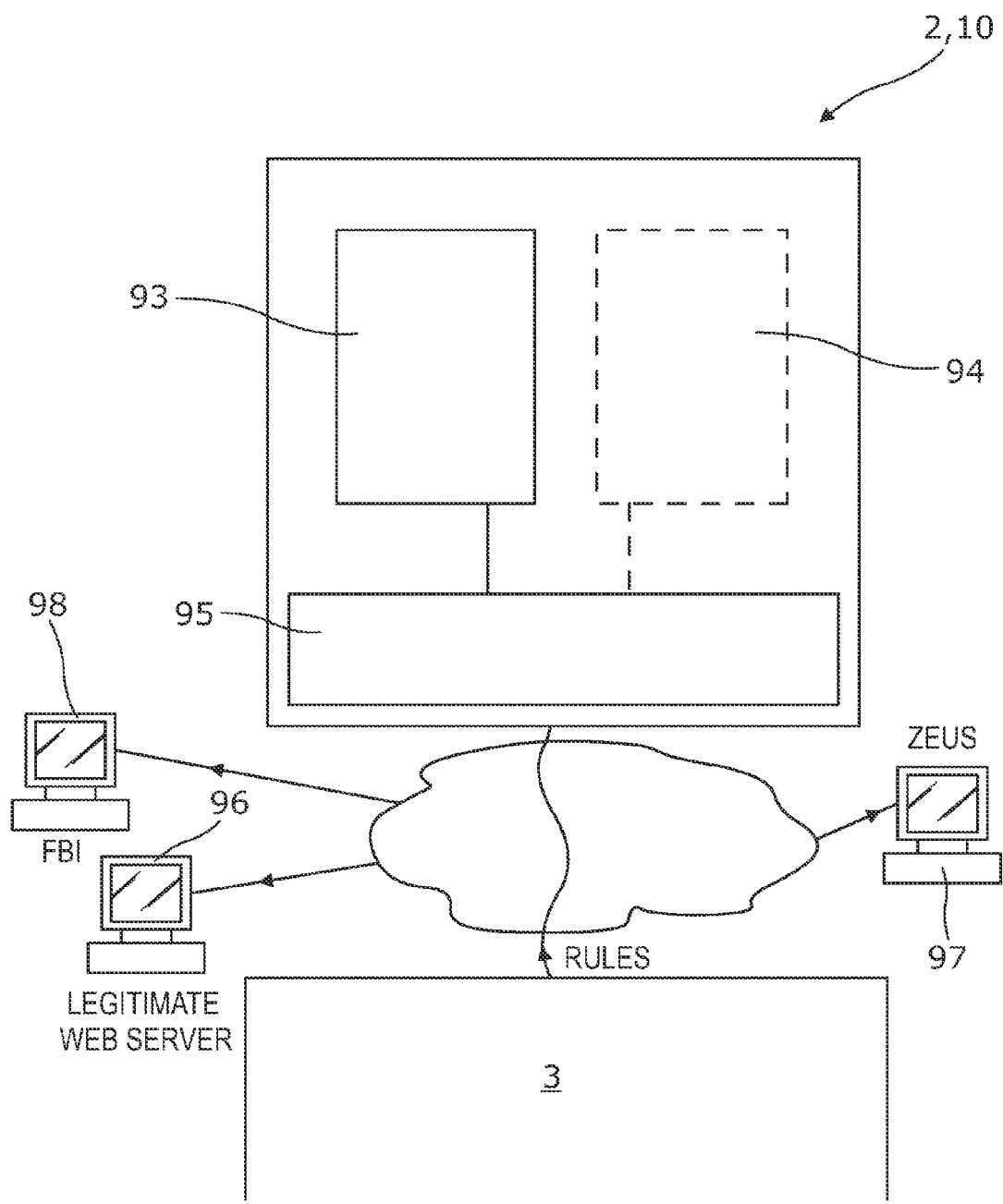
FIG. 14 shows an example of an agent program on a remote computer according to an embodiment of the present invention.

An exemplary embodiment illustrated by FIG. 14 implements a firewall 95 with the agent program 10 at the remote computer 2. A firewall per se is well known. However, normally firewalls are configured by rules input by the user to govern what programs have permission to access the network for incoming/outgoing traffic. The exemplary embodiment additionally takes rules from the base computer 3 to limit, which objects on the remote computer 2 can communicate across the firewall and with which entities 96,97 on the network. For example, information can be sent from the base computer 3 to the firewall 95 that known active URLs of Zeus servers 97 are blocked from exchanging messages from all objects on the remote computer 2. Thus, the firewall 95 can implement a rule blocking communications with the criminal's servers.

This provides a valuable second line of defence against malware. It is generally desirable to stop malware at the point of infection by preventing the malware from infecting a computer. The next line of defence is to stop the malware from communicating. The configurable firewall 95 can therefore leverage the rules and knowledge developed about malevolent objects and network URLs held at the base computer 3 to provide a next line of defence in fighting malware.

Furthermore, in one embodiment, the agent program 10 can be used to contact the authorities 98, e.g., a law enforcement agency, if malevolent Internet traffic is detected. The IP traffic between the infected computer 2 and the criminal's server 97 can be intercepted by the firewall 95, stored and sent to the authorities' server 98, so the authorities can see what information the criminals were stealing through the malware. This information can be sent to the authorities' servers 98 in encrypted form for added security. In the exemplary embodiment, checksums are made and stored of the data that sent to the authorities' servers 98, as there are very strict processes in place for forensic data handling and evidence retention that should be observed.

Legal constraints will mean in most instances it is necessary to obtain permission from the user of the infected computer 2 before this information is captured and sent to a third party. In this situation, the agent program 10 will open a dialogue with the user to obtain permission before proceeding. In some instances, the user may be happy to give blanket permission for data to be sent whenever a malware program or a particular class of malware program is detected on his computer 2, so it will not be necessary to obtain specific permission every time malevolent objects or communication is detected.

Self Defence

Malware has evolved to the state where it will attack, disable or otherwise destroy security products installed on a computer. There are two principle vectors, which need to be considered.

A first approach is to target the methods used by malware to identify security products. In this specific case the malware will use behaviour monitoring of processes running on the remote computer that view, observe, record, examine or otherwise interfere any aspect of the malware code. Examples might be a malware entity watching for processes or tasks which look at the registry keys the malware has used to configure, control or record its operation. As will be appreciated, malware is by its nature surreptitious. From the malware's point of view, no processes on the remote computer should be monitoring or interacting with the malware object, since the existence of the malware object on the local computer should be unknown. If any processes are monitoring the malware, it is therefore likely to be security software or a system monitoring tool or a system tool being used by the user of the computer 2 to rid the computer 2 of the infection.

Thus, by finding processes that are doing this, the malware process can find the identity of the process and its location or locations on disk. This identification then allows it the ability to delete, disable or interfere with the process or processes it has identified as potential threats. In most cases these will indeed be security programs or system monitoring tools, both which it might consider threats.

Many embodiments guard against this possible interference by malware programs by preventing the behavioural detection of a security program when examining the malware. This is achieved by hiding behind, masquerading as, and/or leveraging core operating system components to examine the malware's state and components. In particular, the agent program 10 performs operations by impersonating the system's context when it is necessary to rely on standard system calls, or circumventing any system calls by accessing data at the raw level as it is stored on disk. For example, the agent program 10 can directly impersonate the kernel of the operating system when calling the ZwTerminateProcess function to terminate a malevolent process. In doing so, the malware cannot trace the call back to the agent program. The malware considers this behaviour as normal, as it expects the operating system to interact with it (e.g. it is necessary for the operating system to be able to terminate the process when the computer is shut down), and so the malware does not attempt to terminate the agent program process. Furthermore, the malware cannot react by killing the process as the process is only identifiable as the operating system itself. To kill the operating system would also prevent the malware from operating.

Figure 15:
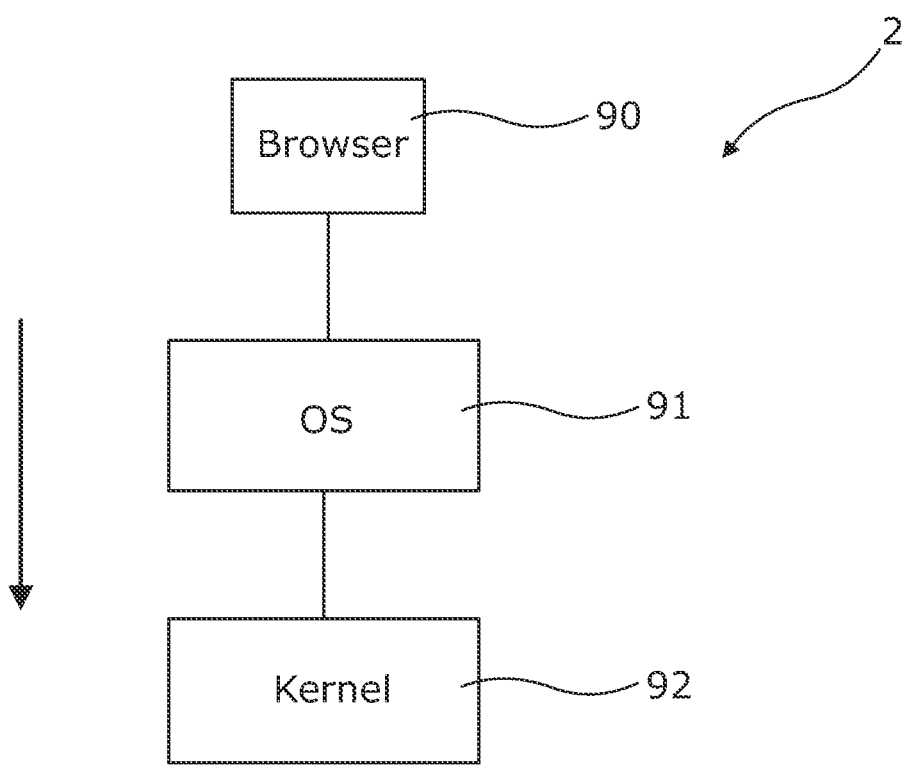
FIG. 15 shows the hierarchy on a computer system.

FIG. 15 shows a hierarchy of control on a computer system 2 going from the kernel level 92 at the lowest level, the operating system level 91, and a web browser running 92 on the operating system 91. A second consideration is that, for malware to assert maximum control over the operation of the computer, it will often attempt to install a driver, possibly a kernel mode driver, which has complete control over processes and actions performed. A type of malware commonly known as a "rootkit" operates in this way and can, among other things, be used to conceal other malware, notably password-stealing key loggers and computer viruses. In certain cases the malware will load a malicious driver and use this to disable security applications and drivers from starting when Windows starts. In particular, the malware may have a list of drivers or program components that it knows correspond to security products.

To prevent malware from using this approach to disabling security applications the agent program 10 dynamically creates a second or backup driver or component 94 which loads as a backup of main component 93 during installation or bootup in the event that the main components 93 are inaccessible (as shown by FIG. 14). It would have identical functionality but would be modified so as to appear different by name and form. This can be randomised, so that the malware cannot learn to identify the security program. In this scenario should the primary component fail to load, most likely due to being killed by malware, the second driver 94 would be loaded to perform its function. If the primary component 93 loads successfully, the secondary component 94 would simply terminate to avoid conflict by identifying the presence of the primary component 93. By randomising the filenames and checksums of the installed objects comprising the agent program 10, the agent program 10 is able to evade heuristic detection by active threats that would attempt to terminate or remove critical agent components.

Later versions of Microsoft's Windows operating system provide enhanced security by requiring system and low level drivers to be signed. This policy, called the kernel mode code signing policy, disallows any unauthorized or malicious driver to be loaded. Some malware creations modify the master boot record to nullify driver certification checks. The malware executed by an infected master boot record bypasses driver signing policy by changing the boot options of Microsoft boot programs that will allow an unsigned driver to load.

So, in these conditions the secondary driver or component could remove its own digital signature to evade detection by the malware. This means it would fail to load unless the master boot record had been modified to disable driver verification. So it represents no threat to an uninfected system and would never load unless the system was infected and the master boot record was modified.

Embodiments of the present invention have been described with particular reference to the examples illustrated. However, it will be appreciated that variations and modifications may be made to the examples described within the scope of the present invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

One of ordinary skill in the art will appreciate that the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of classifying a computer object as malware, the method comprising:
   receiving, at a first threat server, details of a first computer object from a first remote computer, wherein the details of the first computer object include data uniquely identifying the first computer object;
   determining, by the first threat server, whether the first computer object has been previously seen by comparing the data uniquely identifying the first computer object to a plurality of data uniquely identifying plural computer objects in a first database associated with the first threat server;
   receiving additional information about the first computer object from the first remote computer when the first computer object has not been previously seen;
   storing the details of the first computer object and the received additional information about the first computer object in a second database associated with the first threat server when the first computer object has not been previously seen;
   providing contents of the second database to at least one database associated with a central server, wherein the contents comprise a signature of the first computer object, behavior information about the first computer object, and information about the first remote computer;
   increasing a count associated with a number of times that the first computer object has been seen, and providing the increased count associated with the number of times that the first computer object has been seen to the central server; and
   receiving, at a second threat server, at least a portion of the contents of the at least one database associated with the central server, wherein the at least a portion of the contents of the at least one database associated with the central server include a subset of the details of the first computer object stored in the second database.

2. The method according to claim 1, further comprising storing at intervals, the contents of the second database in storage together with a timestamp and clearing the second database.

3. The method according to claim 2, further comprising creating a backup central server by receiving at a second central server, all of the time-stamped blocks of data from the second database and incorporating all of the time-stamped blocks of data into at least one database associated with the second central server.

4. The method according to claim 2, further comprising:
   taking the central server off-line for a period of time such that the central server does not receive data from the first and second threat servers during that period of time;

after the period of time has elapsed, updating at least one database associated with the central server with time-stamped blocks of data from the storage that have a timestamp later than the time when the central server went off-line; and bringing the central server back on line.

5. The method according to claim 2, comprising:

rolling back at least one database associated with the central server to a point of time in the past;

updating the at least one database associated with the central server with time-stamped blocks of data from storage that have a timestamp later than the past point of time; and bringing the central server back on line.

6. The method according to claim 2, wherein the central server comprises:
   a) an object database storing object signatures and metadata about objects;
   b) a behavior database storing object behavior information; and
   c) a computer-object database storing information about what objects are present on what remote computers.

7. The method according to claim 6, wherein the threat and central servers are implemented using cloud computing.

8. The method according to claim 1, further comprising:

receiving, at the second threat server, details of a second computer object from a second remote computer, wherein the details of the second computer object include data uniquely identifying the second computer object;

determining, by the second threat server, whether the second computer object has been previously seen by comparing the data uniquely identifying the second computer object to a plurality of data uniquely identifying plural computer objects in a third database associated with the second threat server;

determining that the second computer object has been seen before;

increasing a count associated with a number of times that the second computer object has been seen and providing the increased count associated with the number of times that the second computer object has been seen to the at least one central server; and receiving, at the first threat server, a count associated with the number of times that the second computer object has been seen.

9. A system for classifying a computer object as malware, the system comprising:

a first threat server arranged to receive details of a computer object from a first remote computer, wherein the details of the first computer object include data uniquely identifying the first computer object, wherein the first threat server is further arranged to receive the details of the computer object from the first remote computer and determine whether the first computer object has been previously seen by comparing the data uniquely identifying the first computer object to a plurality of data uniquely identifying plural computer objects in a first database associated with the first threat server, wherein the first threat server is further arranged to receive additional information about the first computer object from the first remote computer when the first computer object has not been previously seen, store the details of the first computer object and the received additional information about the first computer object in a second database associated with the first threat server when the first computer object has not been previously seen, provide contents of the second database to at least one database associated with a central server wherein the contents comprise a signature of the first computer object, behavior information about the first computer object, and information about the first remote computer, and increase a count associated with a number of times that the first computer object has been seen;

the central server arranged to receive the increased count associated with the number of times that the first computer object has been seen; and a second threat server arranged to receive at least a portion of the contents of the at least one database associated with the central server, wherein the at least a portion of the contents of the at least one database associated with the central server include a subset of the details of the first computer object stored in the second database.

10. The system according to claim 9, wherein the first and second threat servers are arranged to store, at intervals, the contents of the second database in storage together with a timestamp and clear the database.

11. The system according to claim 10, further comprising:
a backup central server having a database, the database of the backup central server being populated by receiving at the backup central server all of the time-stamped blocks of data from the storage and incorporating them into the database of the backup central server.

12. The system according to claim 10, wherein, in the event that the central server is taken off-line for a period of time such that it does not receive updates of data from the first and second threat servers during that period of time, the central server is arranged to, after the period of time has elapsed, update at least one database with time-stamped blocks of data from the storage that have a timestamp later than the time when the central server went off-line.

13. The system according to claim 10, wherein, in the event that at least one database of a central server is rolled back to a point of time in the past, the central server is arranged to update the at least one database with time-stamped blocks of data from storage that have a timestamp later than the point of time in the past.

14. The system according to claim 9, wherein the central server comprises:
   a) an object database storing object signatures and metadata about objects;
   b) a behavior database storing object behavior information; and
   c) a computer-object database storing information about what objects are present on what remote computers.

15. The system according to claim 14, wherein the first and second threat servers and the central server are implemented using cloud computing.

* * * * *